(12) United States Patent
Wang

(10) Patent No.: US 11,199,114 B2
(45) Date of Patent: Dec. 14, 2021

(54) DEVICES, SYSTEMS, AND METHODS FOR GENERATING POWER

(71) Applicant: Taiwan Happy Energy Co., Ltd., Zhubei (TW)

(72) Inventor: Chih Hung Wang, Zhubei (TW)

(73) Assignee: TAIWAN HAPPY ENERGY CO., LTD., Zhubei (TW)

(*) Notice: Subject to any disclaimer, the term of this patent is extended or adjusted under 35 U.S.C. 154(b) by 53 days.

(21) Appl. No.: 16/737,629

(22) Filed: Jan. 8, 2020

(65) Prior Publication Data

US 2021/0054766 A1 Feb. 25, 2021

Related U.S. Application Data

(63) Continuation-in-part of application No. 16/547,307, filed on Aug. 21, 2019, now Pat. No. 10,947,926.

(51) Int. Cl.
| | | |
|---|---|---|
| *F01K 27/00* | (2006.01) | |
| *F03G 7/05* | (2006.01) | |
| *F25B 9/14* | (2006.01) | |
| *F03G 7/04* | (2006.01) | |

(52) U.S. Cl.
CPC .............. *F01K 27/00* (2013.01); *F03G 7/05* (2013.01); *F25B 9/14* (2013.01); *F03G 7/04* (2013.01)

(58) Field of Classification Search
CPC ........ F01K 21/00; F01K 21/005; F01K 21/02; F01K 21/04; F01K 27/00; F03G 7/04; F03G 7/05; F25B 9/14; F25B 30/02; F25B 41/00; F02G 1/0435
See application file for complete search history.

(56) References Cited

U.S. PATENT DOCUMENTS

| | | | | |
|---|---|---|---|---|
| 3,608,311 | A * | 9/1971 | Roesel, Jr. ............ | F02G 1/0435 60/516 |
| 2017/0175672 | A1* | 6/2017 | VanDyne ................ | F22B 1/006 |
| 2018/0371959 | A1* | 12/2018 | Ebert ...................... | F01K 13/02 |

* cited by examiner

*Primary Examiner* — Mark A Laurenzi
*Assistant Examiner* — Xiaoting Hu
(74) *Attorney, Agent, or Firm* — Finnegan, Henderson, Farabow, Garrett & Dunner, LLP

(57) ABSTRACT

A heat pump includes a first chamber, a second chamber fluidly coupled with the first chamber, a first and a second spray devices. The first and second chambers contain working fluid flowable between the first and second chambers via a flow passage between the first and second chambers, and a first and a second space above a portion of the working fluid that is within the first and second chambers. First spray device is coupled with the first chamber to heat or cool the first space in the first chamber. Second spray device is coupled with the second chamber to heat or cool the second space in the second chamber. At least one of the heating and cooling of the first space may cause at least one of a compression or expansion of the second space, which may drive a power-extraction unit coupled with the second chamber.

20 Claims, 27 Drawing Sheets

DEVICES, SYSTEMS, AND METHODS FOR GENERATING POWER

CROSS-REFERENCE TO RELATED APPLICATION

This application is a continuation-in-part application of and claims priority to U.S. Non-Provisional application Ser. No. 16/547,307, which was filed on Aug. 21, 2019 and titled "DEVICES, SYSTEMS, AND METHODS FOR GENERATING POWER."

TECHNICAL FIELD

The present disclosure relates to devices and systems for generating power, and more particularly, to devices and systems for generating electric power based on temperature difference.

BACKGROUND

Conventional power generation, such as nuclear- and coal-based power generation, are common sources of power generation. However, as the rising concern on reducing environmental impacts, such as greenhouse gas emission, nuclear waste disposal, risk concerns, pollution, etc., the need for renewable energy arises. Common examples for renewable energy generation include wind, solar, tide, and other eco-friendly power generation methods.

The temperature gradient between two sources having different temperatures can be used to generate power. For example, energy can be extracted from the temperature difference between a surface and a deeper portion of the earth, or of the oceans, or from residual heat or heat waste common in landfills or from industrial processes. Some of these thermal energy generation systems can be promising for producing electricity.

However, many renewable energy generation solutions have various concerns, such as high manufacturing or system costs, low energy conversion efficiency when compared with conventional power generation systems. Accordingly, there is a need to improve the thermal energy generation systems, in order provide alternatives, provide efficiency, or reduce production costs.

SUMMARY

The present disclosure provides a heat pump. Consistent with one of the embodiments, an energy generation device includes a first chamber, a second chamber, at least one first spray device, a first liquid collecting device, at least one second spray device, and a second liquid collecting device. The first chamber contains a working fluid and a first space within the first chamber, the first space being above at least a portion of the working fluid that is within the first chamber. The second chamber is fluidly coupled with the first chamber. The working fluid is flowable between the first chamber and the second chamber via at least one flow passage between the first chamber and the second chamber. The second chamber contains a second space within the second chamber, the second space being above at least a portion of the working fluid that is within the second chamber. The at least one first spray device is coupled with the first chamber. The at least one first spray device is configured to heat or cool the first space in the first chamber by spaying at least one of liquid or gas into the first chamber. The first liquid collecting device is coupled to the at least one first spray device and arranged to float near a surface of the working fluid within the first chamber. The at least one second spray device is coupled with the second chamber. The at least one second spray device is configured to heat or cool the second space in the second chamber by spaying at least one of liquid or gas into the second chamber. The second liquid collecting device is coupled to the at least one second spray device and arranged to float near a surface of the working fluid within the second chamber. At least one of the heating and cooling of the first space may cause at least one of a compression or expansion of the second space.

Consistent with another embodiments, the present disclosure provides an energy generation system, which may include one or more devices to generate power. Such device may include a first chamber, a second chamber, at least one first spray device, at least one second spray device, and a power-extraction unit coupled with the second chamber. The first chamber contains a working fluid and a first space within the first chamber, the first space being above at least a portion of the working fluid that is within the first chamber. The second chamber is fluidly coupled with the first chamber. The working fluid is flowable between the first chamber and the second chamber via at least one flow passage between the first chamber and the second chamber. The second chamber contains a second space within the second chamber, the second space being above at least a portion of the working fluid that is within the second chamber. The at least one first spray device is coupled with the first chamber. The at least one first spray device is configured to heat or cool the first space in the first chamber by spaying at least one of liquid or gas into the first chamber. The first liquid collecting device is coupled to the at least one first spray device and arranged to float near a surface of the working fluid within the first chamber. The at least one second spray device is coupled with the second chamber. The at least one second spray device is configured to heat or cool the second space in the second chamber by spaying at least one of liquid or gas into the second chamber. The second liquid collecting device is coupled to the at least one second spray device and arranged to float near a surface of the working fluid within the second chamber. At least one of the heating and cooling of the first space may cause at least one of a compression or expansion of the second space, and at least one of the compression or expansion of the second space may drive the power-extraction unit.

Consistent with further embodiments, the present disclosure further provides a heat exchanging system. The heat exchanging system includes at least one heat pump, an input passage, a first output passage, and a second output passage. The at least one heat pump includes a first chamber, a second chamber, at least one first spray device, a first liquid collecting device, at least one second spray device, and a second liquid collecting device. The first chamber contains a working fluid and a first space within the first chamber, the first space being above at least a portion of the working fluid that is within the first chamber. The second chamber is fluidly coupled with the first chamber. The working fluid is flowable between the first chamber and the second chamber via at least one flow passage between the first chamber and the second chamber. The second chamber contains a second space within the second chamber, the second space being above at least a portion of the working fluid that is within the second chamber. The at least one first spray device is coupled with the first chamber. The at least one first spray device is configured to heat or cool the first space in the first chamber by spaying at least one of liquid or gas into the first chamber. The first liquid collecting device is coupled to the at least one first spray device and arranged to float near a surface of the working fluid within the first chamber. The at least one second spray device is coupled with the second chamber. The at least one second spray device is configured to heat or cool the second space in the second chamber by spaying at least one of liquid or gas into the second chamber. The second liquid collecting device is coupled to the at least one second spray device and arranged to float near a surface of the working fluid within the second chamber. The input passage is connecting to the at least one first spray device and the at least one second spray device and is configured to provide the working fluid having a first temperature. The first output passage is connecting to the first and the second liquid collecting devices of the at least one heat pump and configured to output the working fluid having a temperature higher than the first temperature. The second output passage is connecting to the first and the second liquid collecting devices of the at least one heat pump and configured to output the working fluid having a temperature lower than the first temperature.

It is to be understood that the foregoing general descriptions and the following detailed descriptions are exemplary and explanatory only, and are not restrictive of the disclosure, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts. The implementations set forth in the following description of exemplary embodiments are examples of devices and methods consistent with the aspects related to the disclosure as recited in the appended claims, and not meant to limit the scope of the present disclosure.

Figure 1:
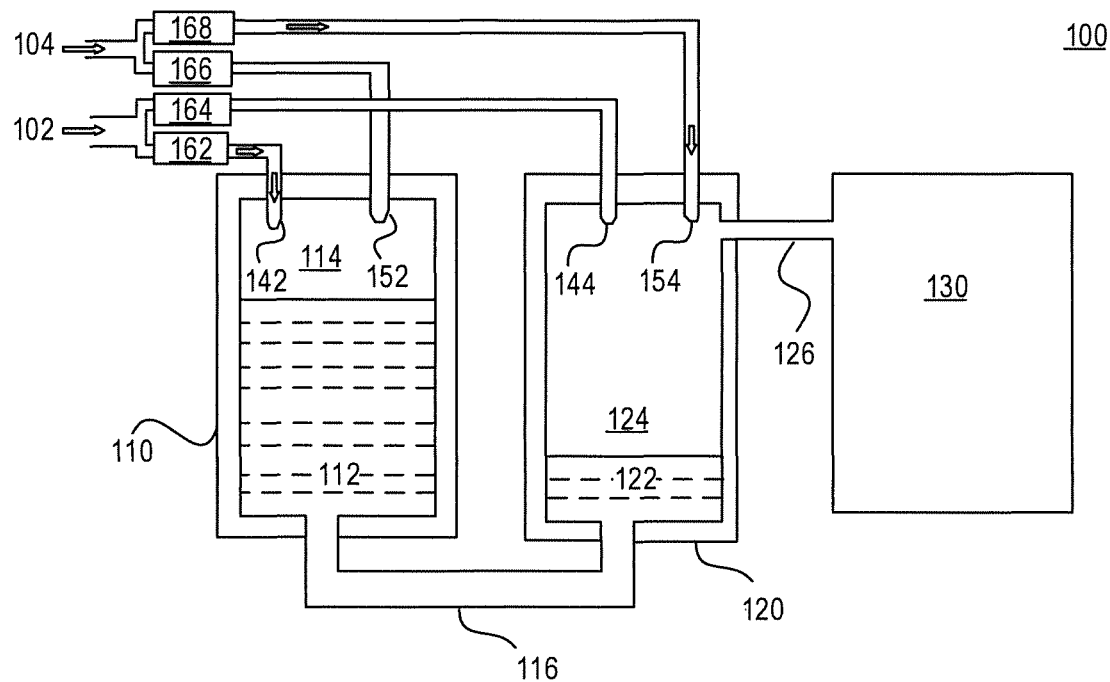
FIG. 1 illustrates an exemplary device to generate power, consistent with some embodiments of the present disclosure.

FIG. 1 is a diagram which illustrates an exemplary device 100 to generate power, consistent with some embodiments of the present disclosure. Device 100, also referred to as a thermodynamic engine, is configured to convert heat provided in the form of a temperature difference to a non-heat form of energy. In some embodiments, device 100 can be applied in various types of thermal energy generation systems for producing electricity by harnessing geothermal energy or the energy of oceans. For example, device 100 can be deployed in an ocean thermal energy generation system to produce power in the form of electricity by using the temperature difference between cooler deep seawater and warmer shallow or surface seawater to run a heat engine. In some other embodiments, device 100 can be deployed in a geothermal energy generation system to harness electricity from the geothermal resources, or in a waste-heat-to-power system to convert waste heat into power.

As shown in FIG. 1, device 100 includes chambers 110, 120 coupled with each other via a flow passage 116, and a power-extraction unit 130. The power-extraction unit 130 is coupled with chamber 120 via a flow passage 126. Chamber 110 contains working fluid 112 and a space 114 above a portion of working fluid 112 that is within chamber 110. Similarly, chamber 120 also contains working fluid 122 and a space 124 above a portion of working fluid 122. Examples of gas that would be suitable for use as a working gas in spaces 114, 124 include air, nitrogen, hydrogen, and helium, but the present disclosure is not limited thereto. In various embodiments, the working gas in spaces 114 and 124 may be the same or different types of gas and may be a combination of two or more gases. Working fluid 112, 122 is flowable between chamber 110 and chamber 120 via a flow passage 116 and used as a liquid piston. Examples of liquids that would be suitable for use as working fluid 112, 122 may include water, seawater, their combinations, or virtually any liquid. In some of the embodiments, a liquid that will not or is less likely to change state in the presence of the working gas in spaces 114, 124 and the working temperatures and pressures of device 100 may be used.

Device 100 further includes spray devices to utilize a thermodynamic Stirling cycle for converting thermal energy. In particular, spray devices in device 100 include heating sprays 142, 144 and cooling sprays 152, 154. Heating spray 142 and cooling spray 152 coupled with chamber 110 are configured to heat or cool space 114 in chamber 110, and heating spray 144 and cooling spray 154 coupled with chamber 120 are configured to heat or cool space 124 in chamber 120. In some embodiments, heating spray 142 is a heating spray configured to heat space 114, and sprays at least one of a liquid, air, and mist having a temperature higher than a current temperature of space 114. As shown in FIG. 1, in a heating process applied to chamber 110, warmer seawater from an input terminal 102 is pumped by a pump 162 and sprayed through heating spray 142 into space 114 to heat space 114. On the other hand, cooling spray 152 is a cooling spray configured to cool space 114, and sprays at least one of a liquid, air, and mist having a temperature lower than a current temperature of space 114. In a cooling process applied to chamber 110, cooler seawater (e.g., seawater in a deep region of the ocean) from an input terminal 104 is pumped by a pump 166 and sprayed through cooling spray 152 into space 114 to cool space 114. That is, heating spray 142 and cooling spray 152 respectively spray the fluid into chamber 110.

Operations and configurations of sprays 144 and 154 are similar to which of the sprays 142 and 152. Heating spray 144 is a heating spray configured to heat space 124, and sprays at least one of a liquid, air, and mist having a temperature higher than a current temperature of space 124. In a heating process applied to chamber 120, warmer seawater from input terminal 102 is pumped by a pump 164 and sprayed through heating spray 144 into space 124 to heat space 124. On the other hand, cooling spray 154 is a cooling spray configured to cool space 124, and sprays at least one of a liquid, air, and mist having a temperature lower than a current temperature of space 124. In a cooling process applied to chamber 120, cooler seawater from input terminal 104 is pumped by a pump 168 and sprayed through cooling spray 154 into space 124 to cool space 124. That is, heating spray 144 and cooling spray 154 respectively spray the fluid into chamber 120.

At least one of the heating and cooling of space 114 causes at least one of a compression or expansion force of space 124, which drives power-extraction unit 130 coupled with chamber 120. Accordingly, a turbine and a generator connected to power-extraction unit 130 can be driven by gas or by other working fluids outputted from power-extraction unit 130 to generate electricity, in response to variations in a temperature of space 114 and of space 124. For ease of understanding, operations of device 100 will be described in detail with accompanying figures in the following paragraphs.

Figure 2:
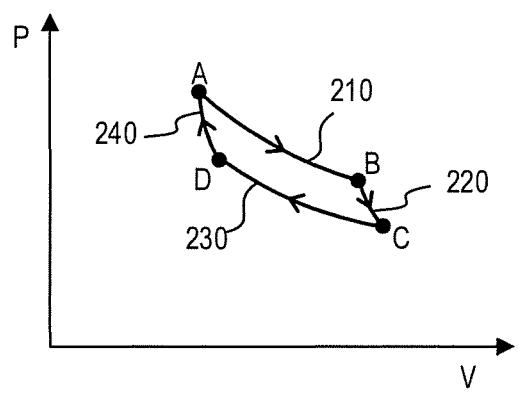
FIG. 2 is a pressure-volume graph illustrating four thermodynamic processes in a Stirling cycle acting on the air or gas in the spaces of the device, consistent with some embodiments of the present disclosure.

Reference is made to FIG. 2 and FIGS. 3A-3D. FIG. 2 illustrates a pressure-volume graph 200 of four thermodynamic processes in a Stirling cycle acting on the air or gas in space 114 and 124, consistent with some embodiments of the present disclosure. The horizontal axis denotes the volume of the gas in the chamber, and the vertical axis denotes the pressure of the gas in the chamber. FIGS. 3A-3D are diagrams illustrating operations of device 100 during the processes in the Stirling cycle shown in FIG. 2, consistent with some embodiments of the present disclosure.

Figure 3A:
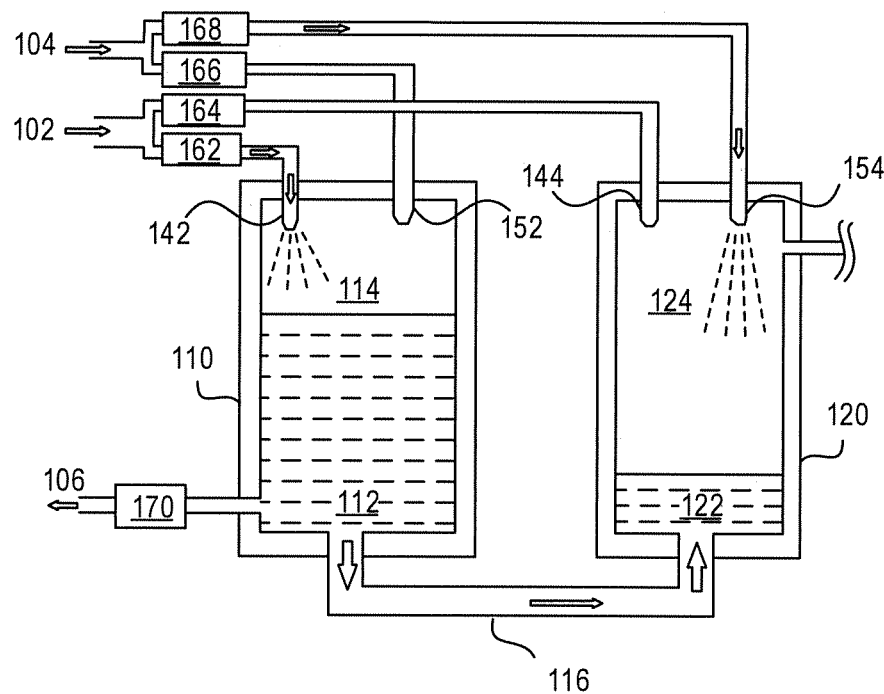
FIGS. 3A-3D are diagrams which illustrate operations of an exemplary device during the processes in the Stirling cycle shown in FIG. 2, consistent with some embodiments of the present disclosure.

In device 100 shown in FIG. 3A, space 114 is at operating point A, while space 124 is at operating point C. As the pressure in space 114 being greater than the pressure in space 124, working fluid flows from chamber 110 to chamber 120 via flow passage 116. Accordingly, the surface of working liquid 122 rises as the surface of working liquid 112 falls. Heating spray 142 sprays warm seawater into chamber 110, cooling spray 154 sprays cool seawater into chamber 120, so that during this stage, the operating point of gas in space 114 moves from point A to point B through curve 210, which represents an isothermal expansion process. On the other hand, the operating point of gas in space 124 moves from point C to point D through curve 230, which represents an isothermal compression process. Therefore, space 114 is maintained at a constant high temperature, and the gas undergoes near-isothermal expansion absorbing heat from a hot source (e.g., warm seawater sprayed from heating spray 142), while space 124 is maintained at a constant low temperature so the gas undergoes near-isothermal compression rejecting heat to a cold sink (e.g., cool seawater sprayed from cooling spray 154).

Figure 3B:
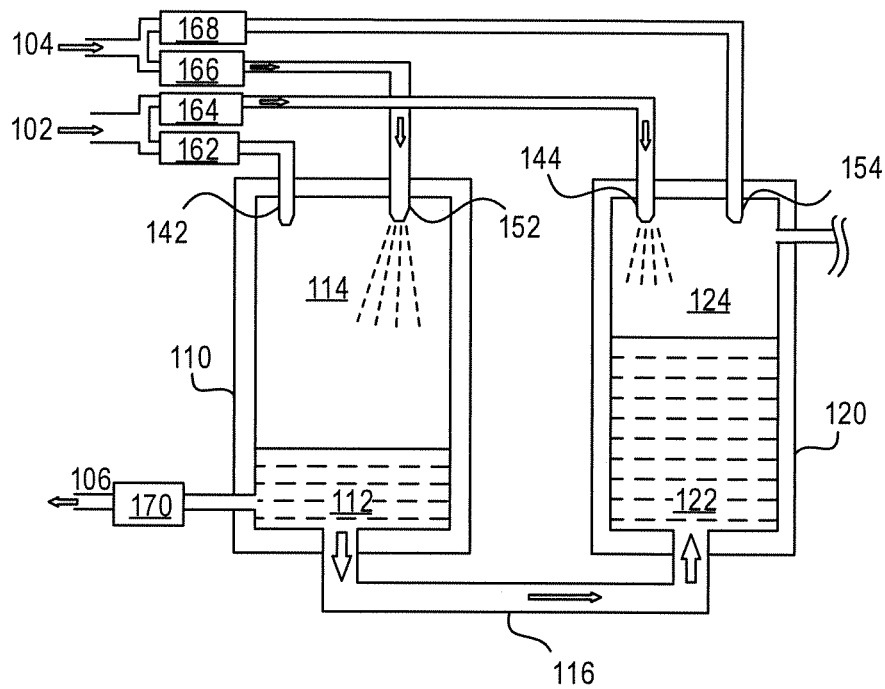

In device 100 shown in FIG. 3B, space 114 is at operating point B, while space 124 is at operating point D. At this stage, working fluid continues to flow from chamber 110 to chamber 120. Gas in space 114 keeps expanding, while gas in space 124 keeps compressing. Cooling spray 152 sprays cool seawater into chamber 110 to cool the gas in space 114, and heating spray 144 sprays warm seawater into chamber 120 to heat the gas in space 124.

Accordingly, as the gas in space 114 is cooled, the operating point of gas in space 114 moves along curve 220 from operating point B to operating point C, which represents a constant-volume, also known as an isometric process or isochoric, heat-removal process, for the next cycle. On the other hand, as the gas in space 124 is heated, the operating point of gas in space 124 moves along curve 240 from operating point D to operating point A, which represents a constant-volume heat-addition process.

Figure 3C:
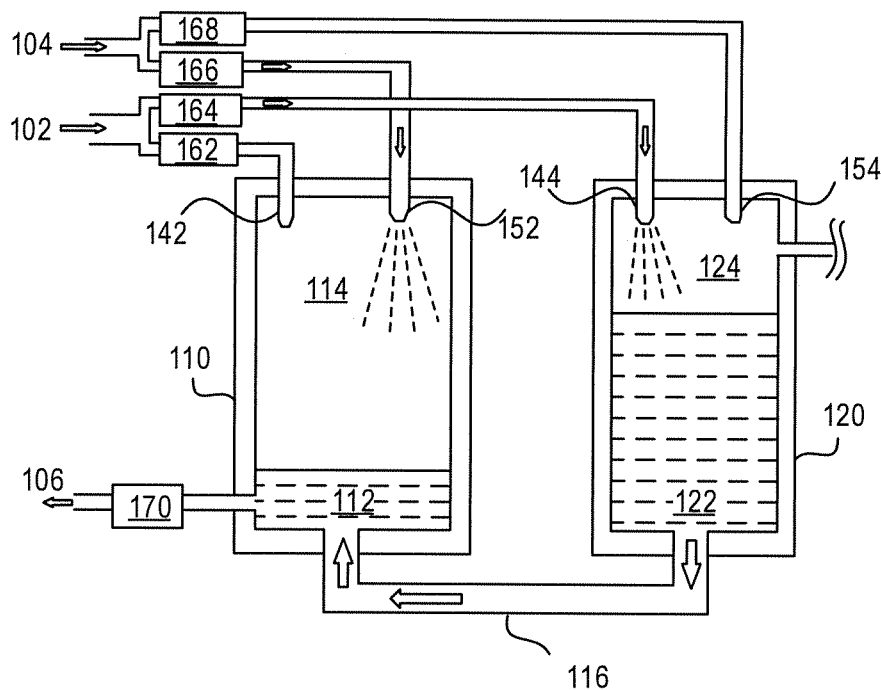

In device 100 shown in FIG. 3C, space 114 is at operating point C, while space 124 is at operating point A. The working fluid stops flowing from chamber 110 to chamber 120, and, as the pressure in space 124 being greater than the pressure in space 114, working fluid starts to flow, in a reverse direction, from chamber 120 to chamber 110 via flow passage 116. Similar to the operations discussed above, the surface of working liquid 112 rises as the surface of working liquid 122 falls. Heating spray 144 sprays warm seawater into chamber 120, cooling spray 152 sprays cool seawater into chamber 110, so that during this stage, the operating point of gas in space 124 moves from point A to point B through curve 210, and the operating point of gas in space 114 moves from point C to point D through curve 230. Therefore, space 124 is maintained at a constant high temperature, and the gas undergoes near-isothermal expansion absorbing heat from a hot source (e.g., warm seawater sprayed from heating spray 144), while space 114 is maintained at a constant low temperature and the gas undergoes near-isothermal compression rejecting heat to a cold sink (e.g., cool seawater sprayed from cooling spray 152).

Figure 3D:
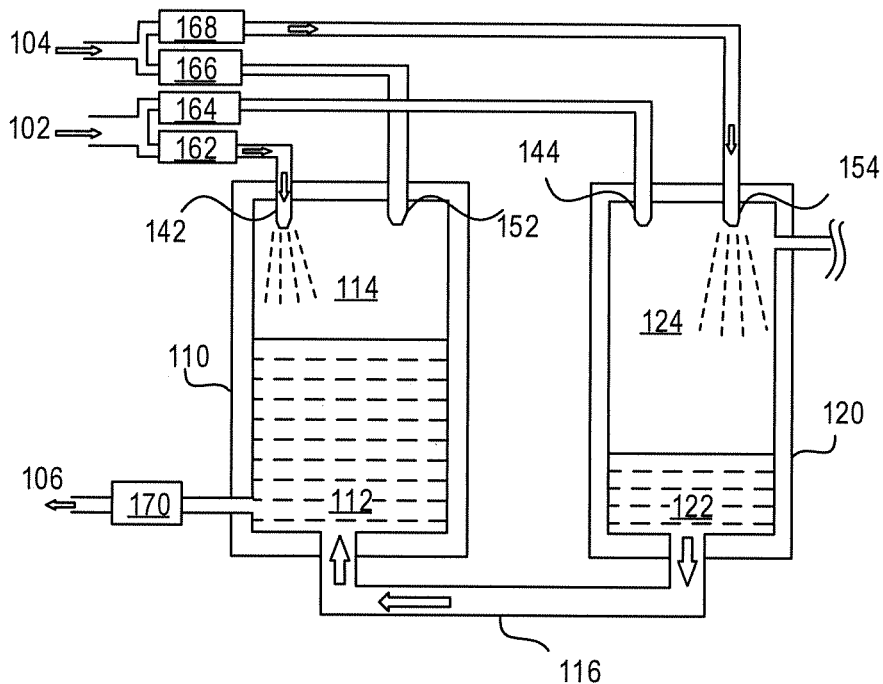

Finally, in device 100 shown in FIG. 3D, space 114 is at operating point D, while space 124 is at operating point B. At this stage, working fluid continues to flow from chamber 120 to chamber 110. Gas in space 124 keeps expanding, while gas in space 114 keeps compressing. Cooling spray 154 sprays cool seawater into chamber 120 accordingly in order to cool the gas in space 124, and heating spray 142 sprays warm seawater into chamber 110 accordingly in order to heat the gas in space 114. Accordingly, as the gas in space 124 is cooled, the operating point of gas in space 124 moves along curve 220 from operating point B to operating point C, which represents a constant-volume, also known as isovolumetric or isochoric, heat-removal process, for the next cycle. As the gas in space 114 is heated, the operating point of gas in space 114 moves along curve 240 from operating point D to operating point A, which represents a constant-volume heat-addition process.

As shown in FIGS. 3A-3D, in some embodiments, device 100 further includes a discharging valve 170, which is coupled with chamber 110 and configured to control a discharging passage 106 for discharging the working fluid. Therefore, while seawater is sprayed into chambers 110, 120 during the operations, by discharging same amount of the seawater, the total volume of the working fluid in device 100 remains constant. In some other embodiments, discharging valve 170 may be coupled with chamber 120, or coupled with both chamber 110 and chamber 120, and configured to control discharging passage 106 for discharging the working fluid.

Through the operations described above, a heat cycle through curves 210, 220, 230, and 240 is completed for both chambers 110 and 120. Through repeating the heating and cooling processes described with reference to FIGS. 3A-3D, the heat cycle may repeat continuously and convert heat energy to pressure energy stored in gas. After that, power-extraction unit 130 can further convert the pressure energy stored in the gas into electricity.

Figure 4A:
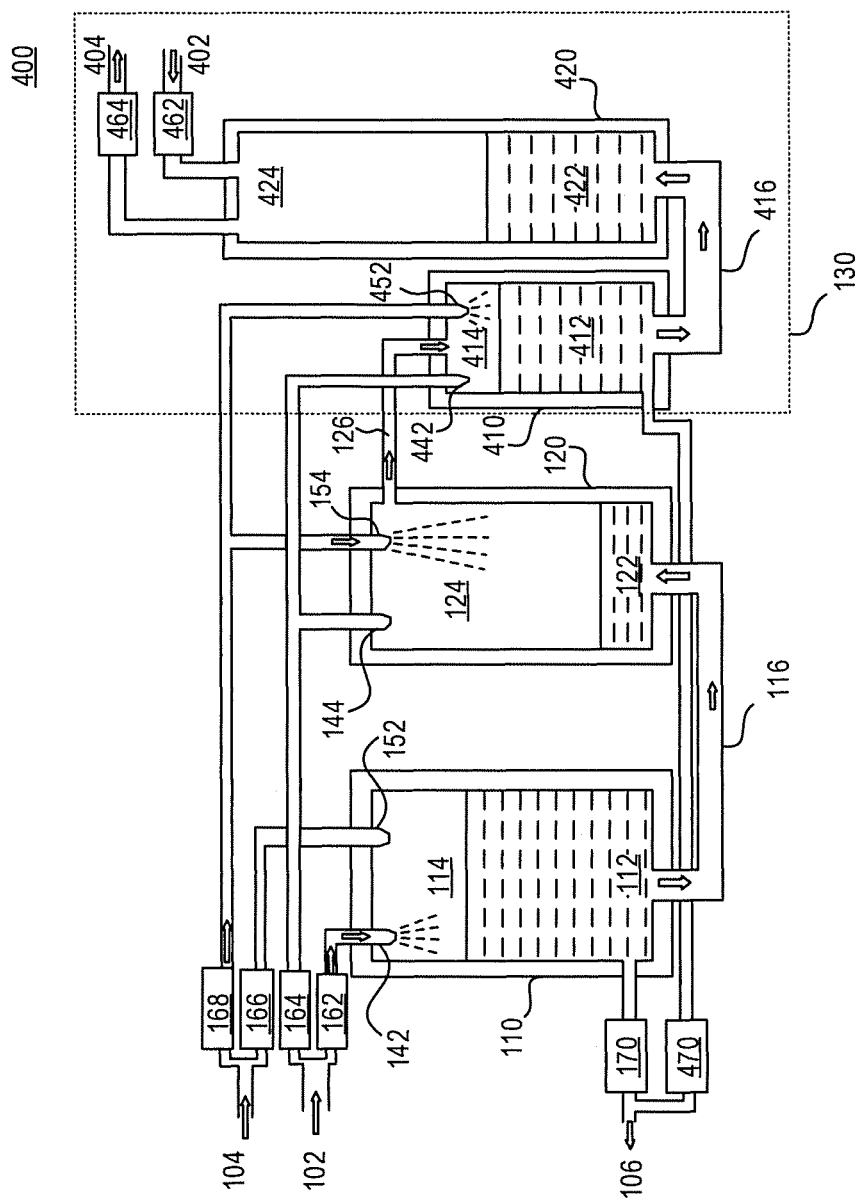
FIG. 4A and FIG. 4B illustrate an exemplary device to generate power, consistent with some embodiments of the present disclosure.
Figure 4B:
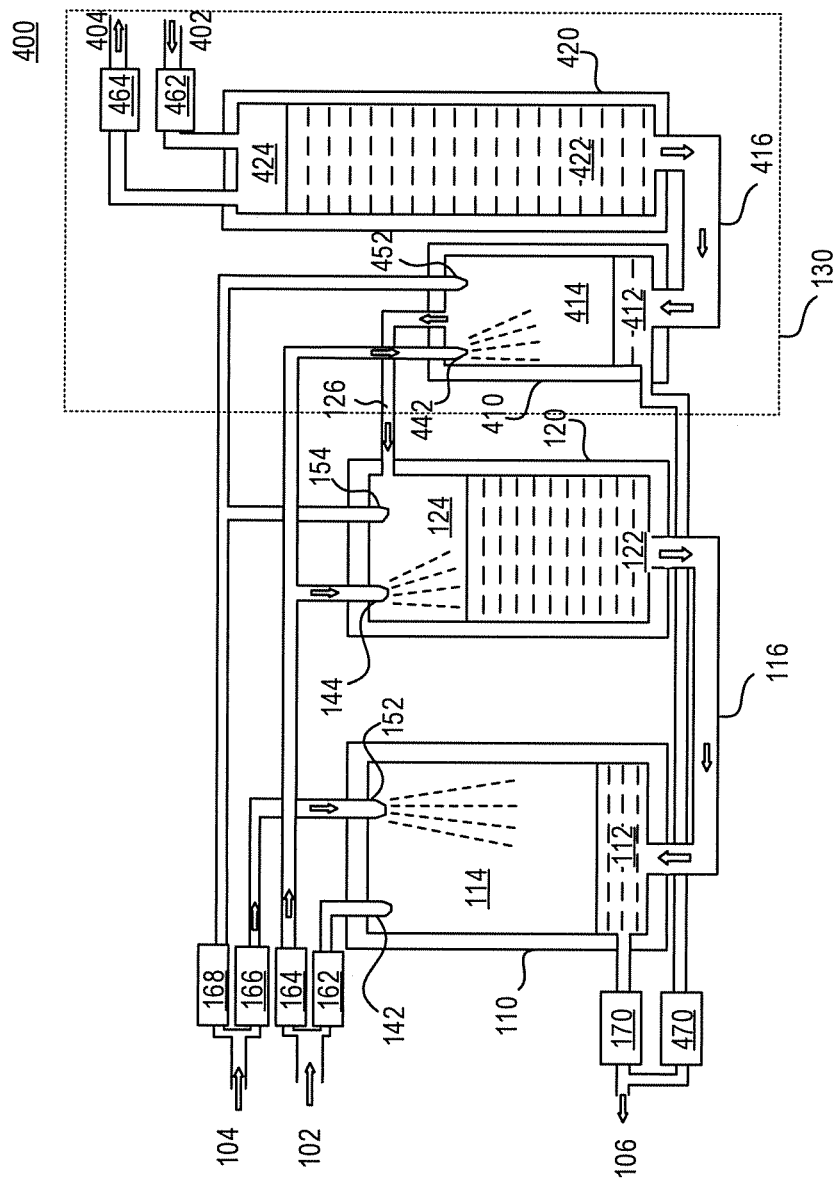

FIG. 4A and FIG. 4B are diagrams which illustrate a device 400 to generate power, consistent with some embodiments of the present disclosure. As shown in FIG. 4A and FIG. 4B, in some embodiments, in device 400, power-extraction unit 130 includes an input terminal 402, an output terminal 404, and chambers 410 and 420. Chamber 410 is coupled with chamber 120 via flow passage 126 and contains working fluid 412 and a space 414 inside chamber 410 above a portion of working fluid 412 that is within chamber 410. Chamber 420 also contains working fluid 422 and a space 424 inside chamber 420 above a portion of working fluid 422 that is within chamber 420. As shown in FIG. 4A and FIG. 4B, chamber 420 is coupled with chamber 410 via a flow passage 416, so that the working fluid is flowable between chamber 410 and chamber 420 via flow passage 416.

Input terminal 402 and output terminal 404 are coupled with chamber 420 respectively via control valves 462 and 464 configured to control the gas flowing into or flowing out of chamber 420. Therefore, in response to the compression or expansion force of space 124, gas within space 424 can be outputted from chamber 420 via output terminal 404, and gas with a pressure lower than an output pressure of the gas outputted from chamber 420 can be fed into chamber 420 via input terminal 402, under the control of control valves 462 and 464.

A heating spray 442 and a cooling spray 452 are coupled with chamber 410 and configured to heat or cool space 414 in chamber 410 by spraying at least one of a liquid, air, and mist having a temperature higher or lower than the current temperature of space 414. As shown in FIG. 4A and FIG. 4B, configurations and arrangements of heating spray 442 and cooling spray 452 coupled with chamber 410 are the same as or similar to sprays 144 and 154 coupled with chamber 120. Also, a discharging valve 470 is coupled with chamber 410 or chamber 420 and configured to control discharging passage 106 for discharging the working fluid. Therefore, while seawater is sprayed into chambers 410, 420 during the operations, by discharging the same amount of the seawater, the total volume of the working fluid remains constant.

As shown in FIG. 4A, since space 414 communicates with space 124, in response to the compression force of space 124, the pressure of gas in space 414 increases, and the working liquid flows from chamber 410 to chamber 420 via flow passage 416, which causes a compression force of space 424. When the gas pressure of space 424 equals to the pressure at output terminal 404, control valve 464 opens and gas within space 424 is outputted from chamber 420 via output terminal 404, until the surface of working fluid 112 in chamber 110 reaches the lowest level.

As shown in FIG. 4B, after the surface of working fluid 112 in chamber 110 reaches the lowest level, in response to the expansion force of space 124, the pressure of gas in space 414 decreases, and the working liquid flows reversely from chamber 420 to chamber 410 via flow passage 416, which causes an expansion force of space 424. When the gas pressure of space 424 equals to the pressure at input terminal 402, control valve 462 opens and gas with a pressure lower than the pressure of the outputted gas is fed into chamber 420 via input terminal 402, until the cycle is completed with the surface of working fluid 112 in chamber 110 reaching the highest level. By operations described above, high pressure gas can be obtained from output terminal 404, and the mechanical power can then be extracted by various engines, such as a reciprocating engine, or a turbine engine, in order to generate electricity. Flow of the gas causes rotation of the turbine which can be used to drive a generator or other mechanical device to extract energy from device 400.

In view of the above, in some embodiments, by spraying a liquid, air, or mist having a relative high temperature in the chambers, the gas in a chamber can be heated evenly and results in a greater heat transfer efficiency. The compression or expansion force applied to a working fluid, which may be viewed like or work as the liquid piston, can then cause power-extraction unit 130 to output high pressure gas to drive the turbine and generator in the thermal energy generation system.

Figure 5:
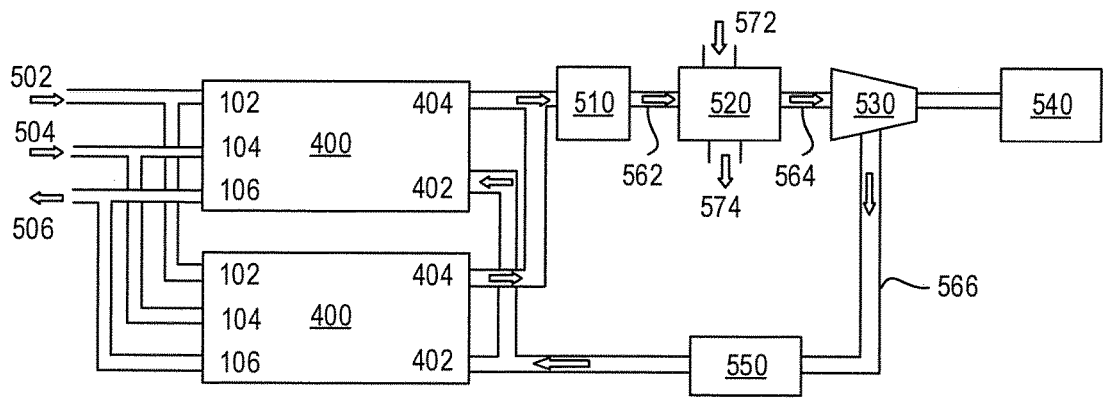
FIG. 5 illustrates an exemplary ocean thermal energy conversion (OTEC) system having multiple devices of FIG. 4A and FIG. 4B, consistent with some embodiments of the present disclosure.

Reference is made to FIG. 5, which illustrates an exemplary ocean thermal energy conversion (OTEC) system 500, consistent with some embodiments of the present disclosure. As shown in FIG. 5, OTEC system 500 includes two devices 400 connected in parallel, input terminals 502, 504, a discharging terminal 506, a high-pressure tank 510, a heating device 520, a turbine engine 530, a generator 540, and a low-pressure tank 550. It is noted that OTEC system 500 illustrated in FIG. 5 is an example and not meant to limit the present disclosure. In some embodiments, OTEC system 500 may include three or more devices 400 connected in parallel.

Input terminal 502 is configured to receive warmer shallow or surface seawater and connected to input terminals 102 of devices 400. Input terminal 504 is configured to receive cooler deep seawater and connected to input terminals 104 of devices 400. Discharging terminal 506 is configured to discharge seawater after use and connected to discharging passages 106 of devices 400.

When devices 400 output the gas with high pressure from output terminals 404, as described in the operations illustrated in FIG. 4A and FIG. 4B, the outputted gas is fed into high-pressure tank 510 and then provided, via a pipe 562, to heating device 520. Heating device 520 is configured to heat the gas using the warm seawater or other heat source, in which terminals 572 and 574 are the input and output terminals of the heat source. The heated gas is then provided, via a pipe 564, to turbine engine 530 and drives turbine engine 530 to output mechanical power for generator 540 to generate electricity. After passing through turbine engine 530, the gas with lower pressure discharges through an exhaust of turbine engine 530 and is provided, via a pipe 566, to a low-pressure tank 550. Therefore, low pressure gas can be circulated back into devices 400 via input terminal 402 connected to low-pressure tank 550 for the use in the following cycle. It is noted that, in some embodiments, multiple devices 400 in OTEC system 500 can output high pressure gas in different phases correspondingly. Therefore, the variation of pressure can be reduced in order to provide a stable output with lower fluctuation.

By utilizing multiple devices 400 as the thermodynamic engine, OTEC system 500 can achieve a simplified structure with fewer device components and simple pipe arrangements. Therefore, a lower manufacturing cost can be guaranteed when compared to those using conventional thermodynamic engines, and the per unit electricity generation cost can be reduced. In addition, devices 400 can be used as the thermodynamic engine in both a low-temperature difference (LTD) Stirling engine scenario, and a high-temperature difference (HTD) Stirling engine scenario. In some embodiments, devices 400 can be operated with a wide range of temperature differences, such as 1° C., 10° C., 100° C. and a value between about 1° C. to 100° C. The temperature range can also vary depending on the operating pressure. In other words, a device can work with (or as) an energy generation system using ocean thermal energy, geothermal energy, landfill heat energy, waste heat from industrial processes, etc., as the heat source. In addition, when applied in applications with the high temperature difference (e.g., greater than 100° C.) between chambers, devices 400 can provide a higher energy conversion efficiency when compared to the conventional thermodynamic engines.

Figure 6:
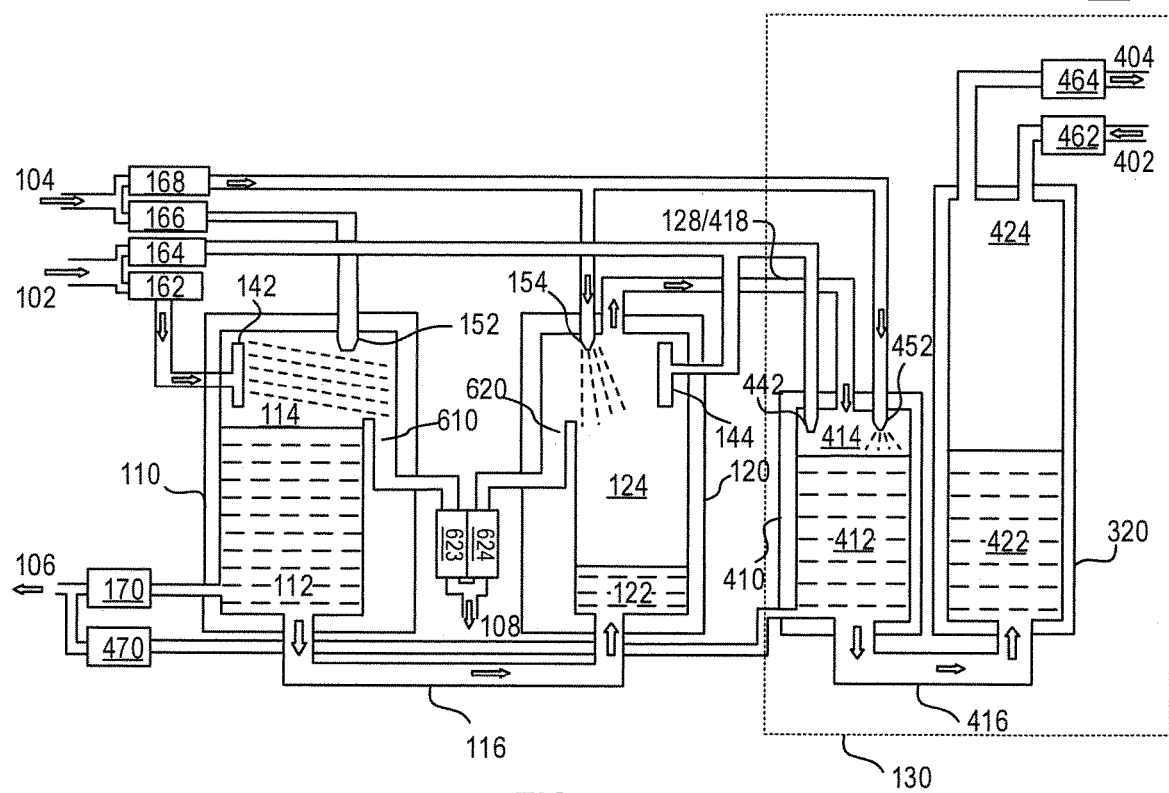
FIG. 6 illustrates an exemplary device to generate power, consistent with some embodiments of the present disclosure.

Reference is made to FIG. 6, which illustrates a device 600 to generate power, consistent with some embodiments of the present disclosure. In some embodiments, device 600 can be deployed in a geothermal energy conversion (GEC) system, in which the heat stored in hot water piped from the underground is converted into other forms of energy, such as electricity. Compared to device 400 shown in FIG. 4A and FIG. 4B, device 600 further includes liquid recycle chambers 610 and 620, and liquid recycle valves 623 and 624. As shown in FIG. 6, liquid recycle chamber 610 is coupled with chamber 110, and heating spray 142 is configured to spray the liquid into liquid recycle chamber 610, while cooling spray 152 is configured to spray the fluid into chamber 110. Similarly, liquid recycle chamber 620 is coupled with chamber 120, and heating spray 144 is configured to spray the liquid into liquid recycle chamber 620, while cooling spray 154 is configured to spray the fluid into chamber 120.

Liquid recycle valves 623 and 624 are respectively coupled with liquid recycle chambers 610, 620 and configured to control a passage 108 for discharging liquid in liquid recycle chambers 610, 620. By arranging liquid recycle chambers 610 and 620 and liquid recycle valves 623 and 624, instead of mixing with the working fluid in chamber 110, 120, the hot water can be collected after heating the gas in space 114, 124 and then be sprayed into another device 600. That is, the same heat source (e.g., hot water from underground) can heat chambers 110 and 120 in multiple devices 600.

Figure 7:
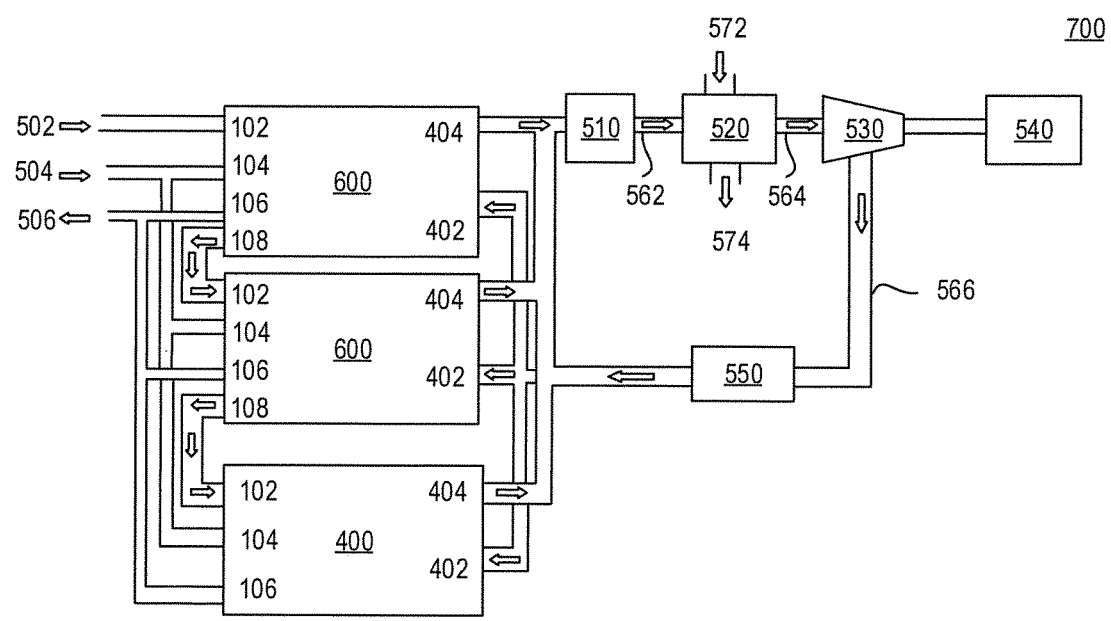
FIG. 7 illustrates an exemplary geothermal energy conversion (GEC) system having multiple devices of FIG. 6, consistent with some embodiments of the present disclosure.

Reference is made to FIG. 7, which illustrates an exemplary GEC system 700 having multiple devices 600 illustrated in FIG. 6, consistent with some embodiments of the present disclosure. Compared to OTEC system 500 shown in FIG. 5, GEC system 700 includes multiple devices 600, and passage 108 of one device 600 is connected to input terminal 102 of a next-stage device 600 for providing heat source. For the sake for simplicity and ease of understanding, FIG. 7 illustrates two devices 600 and one device 400 at the end stage of GEC system 700, but the present disclosure is not limited thereto. In various embodiments, the number of devices 600 deployed in GEC system 700 can be modified based on actual needs and practices.

In GEC system 700, in a geothermal well installation, hot water from underground can be piped and provided via input terminal 502 and flow through multi-stages of devices 600 as the heat source to heat gas in chambers of multiple devices 600. Accordingly, thermal energy stored in the hot water can be extracted in multiple stages in order to produce a higher energy conversion efficiency. At the last stage, passage 108 of device 600 in penultimate stage is connected to input terminal 102 of device 400. Therefore, the fluid is sprayed into chambers 110, 120 of device 400 at the last stage in GEC system 700, and then discharged via discharging passage 106 of device 400. Other operations in GEC system 700 shown in FIG. 7 are the same as or similar to operations of OTEC system 500 shown in FIG. 5.

Figure 8:
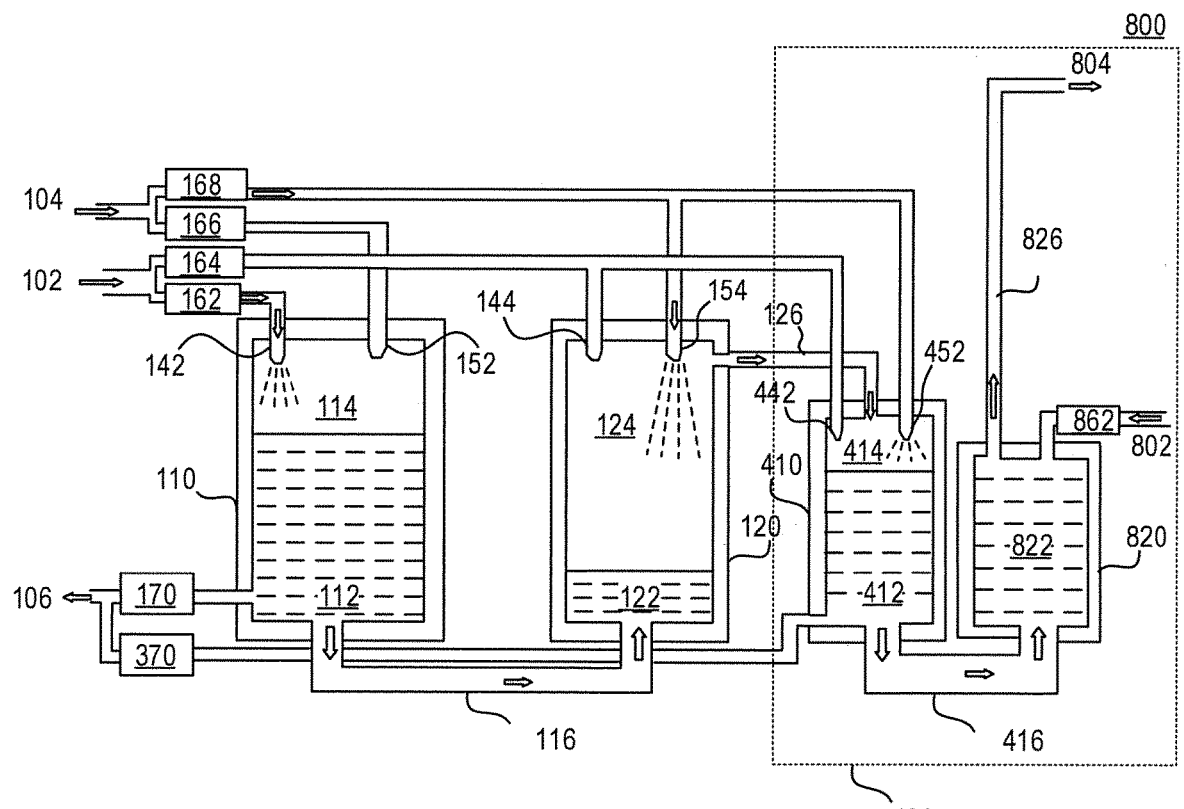
FIG. 8, FIG. 9, FIG. 10A and FIG. 10B illustrate exemplary devices to generate power, consistent with some embodiments of the present disclosure.

In various embodiments, power-extraction unit 130 can be realized by different approaches. Reference is made to FIG. 8, which illustrates a device 800 to generate power, consistent with some embodiments of the present disclosure. Compared to device 400 shown in FIG. 4A and FIG. 4B, power-extraction unit 130 in device 800 includes chambers 410 and 820, an input terminal 802 coupled with chamber 820, and an output terminal 804 coupled with chamber 820. Similar to chamber 420 in FIG. 4A and FIG. 4B, chamber 820 also contains working fluid 822. Working fluid 412, 822 is flowable between chamber 410 and chamber 820 via flow passage 416 connecting chambers 410 and 820.

Input terminal 802 is coupled with chamber 820 via a control valve 862 configured to control the working fluid flowing into chamber 820. Therefore, in response to the compression or expansion force of space 124, working fluid 822 within chamber 820 can be raised via a flow passage 826 and outputted via output terminal 804. Accordingly, working fluid is transferred to a water tower or a reservoir at a relatively high location, and the energy is converted in the form of potential energy of the working fluid, which is proportional to an altitude difference between the water tower or the reservoir, and a lower tank coupled to input terminal 802. By releasing the working fluid from the water tower or the reservoir into the lower tank through one or more turbines, water can drive the turbine(s) and one or more generators coupled to the turbine(s) to produce electricity. Then, working fluid can flow back into chamber 820 via input terminal 802, under the control of control valve 862.

Accordingly, in various embodiments, the generator connected to power-extraction unit 130 is configured to generate electricity driven by gas or by the working fluid outputted from the power-extraction unit, in response to variations in a temperature of space 114 and of space 124.

Figure 9:
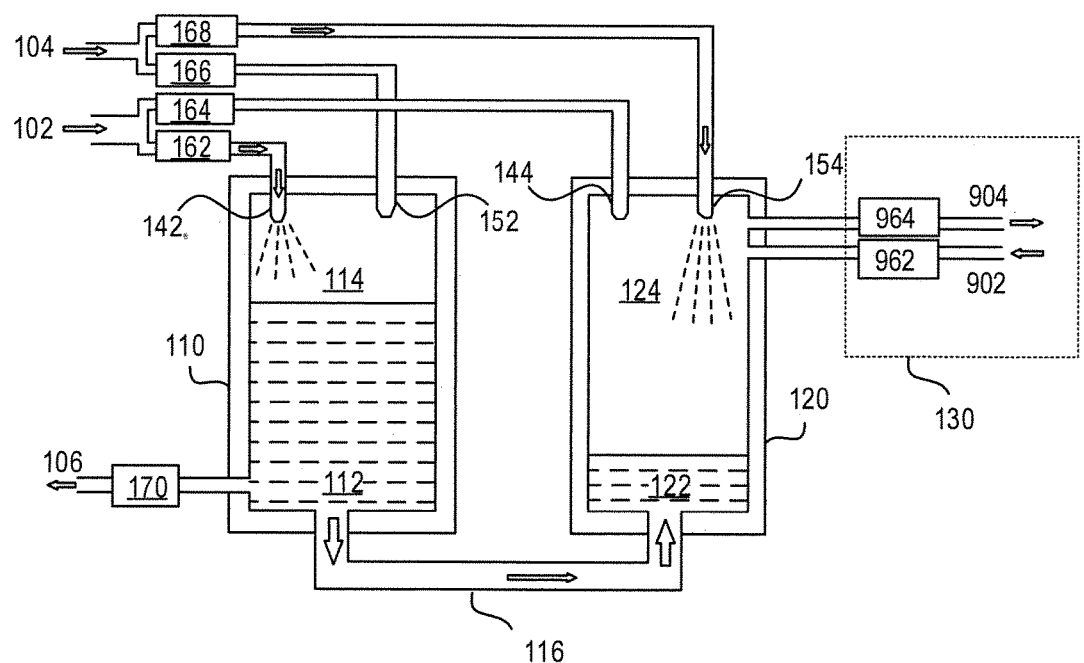

Reference is made to FIG. 9, which illustrates a device 900 to generate power, consistent with some embodiments of the present disclosure. In device 900, power-extraction unit 130 can be realized without additional chambers. In response to the compression or expansion force of space 124, a portion of gas in space 124 can be outputted directly with a relative high pressure via an output terminal 904, under the control of a control valve 964 coupled between chamber 120 and output terminal 904. Then, after driving the turbine and generator, gas with a relative low pressure can be fed back into chamber 120 via an input terminal 902, under the control of a control valve 962 coupled between chamber 120 and input terminal 902. In particular, in some embodiments, the amount of gas outputted via output terminal 904 can be detected via a detection component. In response to the amount of the outputted gas reaching a threshold value or in response to the level of working fluid 112 in chamber 110 reaching a lowest level, control valve 964 is configured to terminate the outputting of the gas in chamber 120.

Figure 10A:
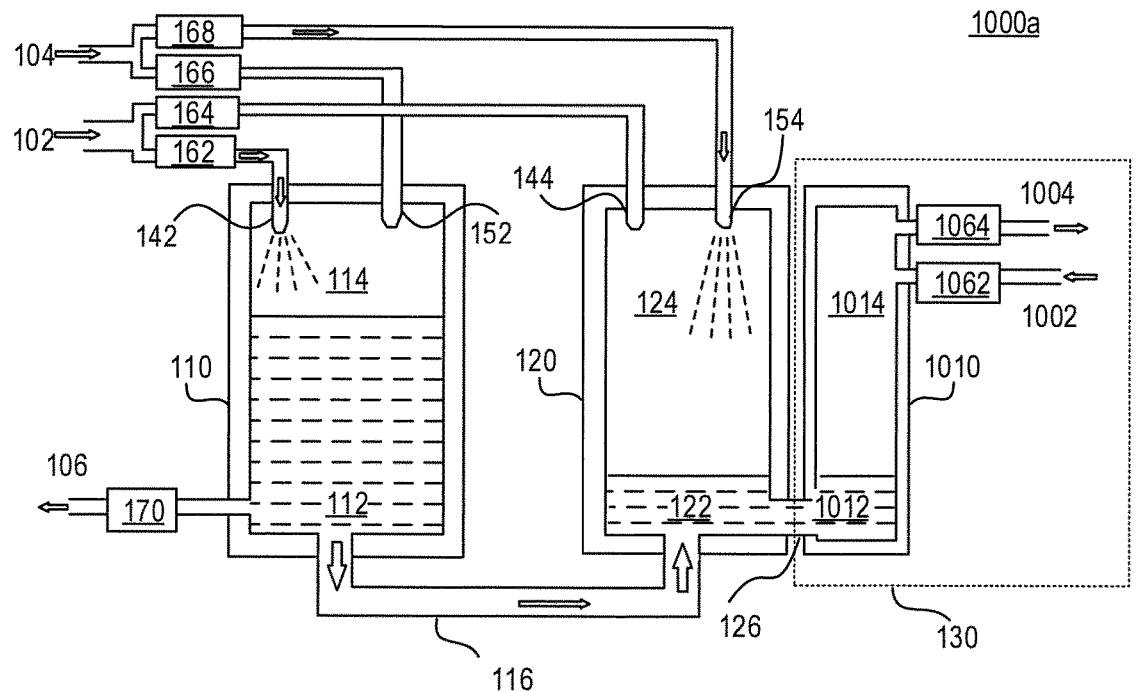
Figure 10B:
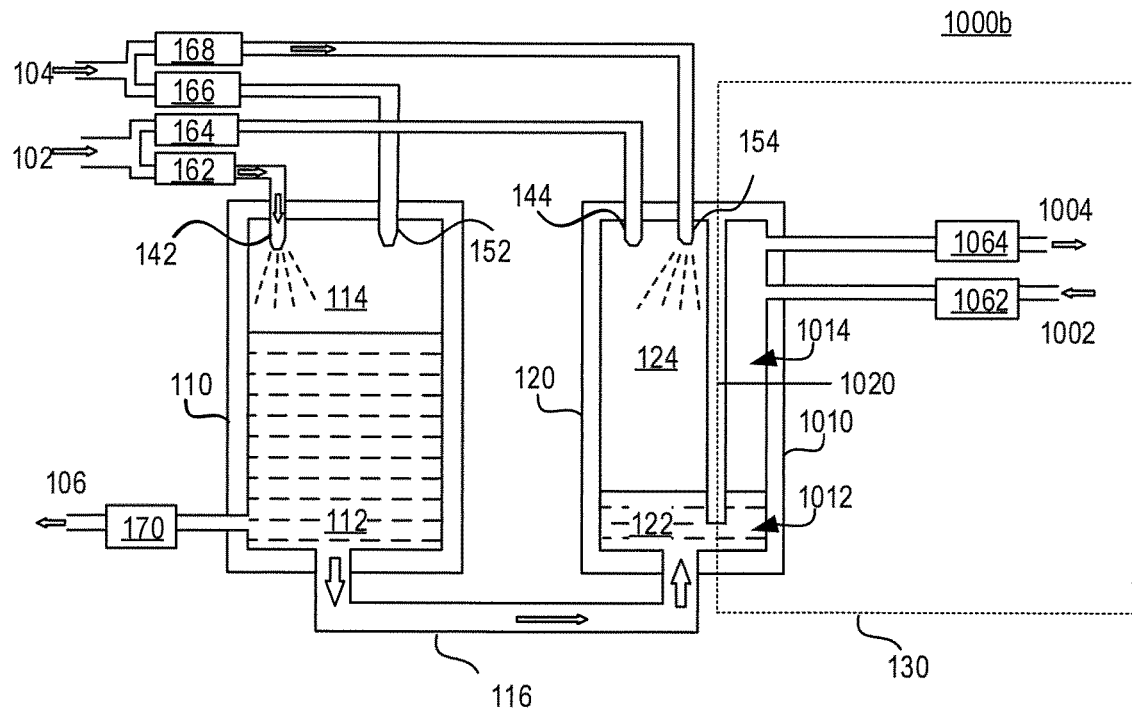

Reference is made to FIG. 10A and FIG. 10B, which illustrate devices 1000a and 1000b to generate power, consistent with some embodiments of the present disclosure. In device 1000a shown in FIG. 10A, power-extraction unit 130 includes one chamber 1010 coupled with chamber 120 via flow passage 126, an input terminal 1002 and an output terminal 1004, both coupled with chamber 1010. Similarly, chamber 1010 contains working fluid 1012 and a space 1014 inside chamber 1010 above a portion of working fluid 1012 that is within chamber 1010. In some embodiments, the length of flow passage 126 connecting chambers 120 and 1010 is shorter than the length of flow passage 116 connecting chambers 110 and 120.

Accordingly, in response to the compression or expansion force of space 124, gas within space 1014 is outputted from chamber 1010 via output terminal 1004, under the control of a control valve 1064 coupled between chamber 1010 and output terminal 1004. Then, after driving the turbine and generator, gas with a relative low pressure can be fed into chamber 1010 via input terminal 1002, under the control of a control valve 1062 coupled between chamber 1010 and input terminal 1002. As shown in FIG. 10B, in some embodiments, chamber 120 and chamber 1010 can also be implemented by two partitions, partially separated by a wall 1020, while working fluid (e.g., working fluid 122, 1012) is still flowable between chamber 120 and chamber 1010. Operations of devices 1000a and 1000b are the same as or similar to those described above in aforementioned embodiments.

In view of the above, different designs and configurations can be applied in power-extraction unit 130. The embodiments illustrated in the above figures are merely examples and not meant to limit the present disclosure. It will be apparent to those skilled in the art that various modifications and variations can be made to implement generation unit 130, in order to provide high pressure gas, or working fluid with potential energy for driving the turbine and the generator to produce electricity.

Figure 11:
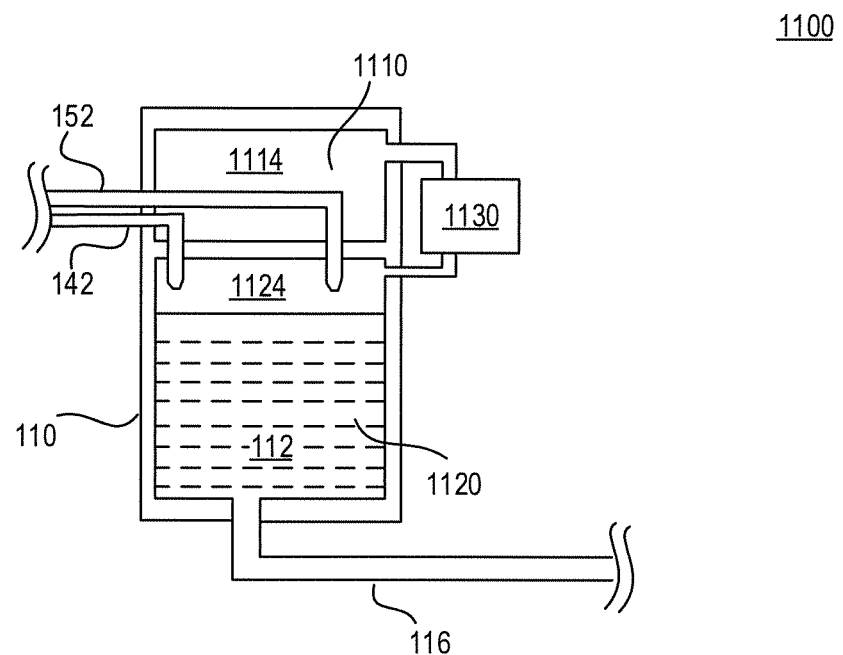
FIG. 11, FIG. 12, and FIG. 13 illustrate alternative designs of a chamber in a device to generate power, consistent with some embodiments of the present disclosure.

In addition, different designs and configurations can also be applied in chamber 110 and chamber 120 to achieve greater thermal efficiency in the thermodynamic engine. Reference is made to FIG. 11, which illustrates an alternative design of chamber 110 in a device 1100 to generate power, consistent with some embodiments of the present disclosure. In device 1100, chamber 110 includes two separate partitions, sub-chambers 1110 and 1120. Sub-chamber 1110 contains gas in space 1114, and sub-chamber 1120 contains working fluid 112 and gas, above a portion of working fluid 112, in space 1124. Device 1100 further includes a regenerator 1130 coupled between sub-chambers 1110 and 1120. During the operations of device 1100, in the constant-volume heat-addition process, regenerator 1130 can be configured to provide heat when the gas flows, via regenerator 1130, from sub-chamber 1110 to sub-chamber 1120. Similarly, in the constant-volume heat removal process, regenerator 1130 can be configured to store heat when the gas flows, via regenerator 1130, from sub-chamber 1120 to sub-chamber 1110. As a result, the gas in space 1114 remains at a relative low temperature, compared to the gas in space 1124. By utilizing regenerator 1130 to heat and cool the gas flowing between two sub-chambers 1110 and 1120, the required input energy in the constant-volume heat-addition process (e.g., curve 240 from operating point D to operating point A in FIG. 2) can be lowered to achieve a greater thermal efficiency in a complete heat cycle. Moreover, while chamber 110 is used as an example in FIG. 11, the regenerator can also be applied in chamber 120 having sub-chambers to perform similar operations.

Figure 12:
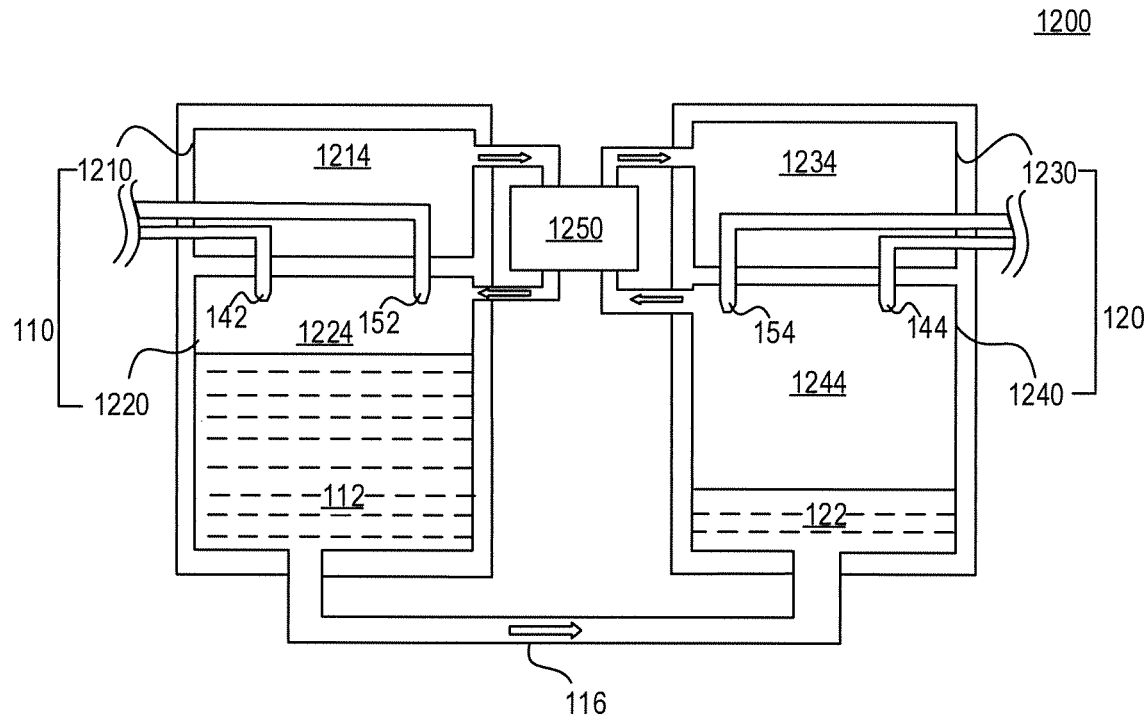

Reference is made to FIG. 12, which illustrates an alternative design of chambers 110 and 120, consistent with some embodiments of the present disclosure. In device 1200, each of the chambers 110 and 120 includes two separate partitions, sub-chambers 1210, 1220 and 1240, 1250 respectively. Sub-chambers 1210 and 1230 each contain gas in spaces 1214, 1234, and sub-chambers 1220 and 1240 each contain working fluid 112, 122 and gas, above a portion of working fluid 112, 122, in spaces 1224, 1244.

Device 1200 further includes a heat exchanger 1250 coupled with chamber 110 and chamber 120. Heat exchanger 1250 is configured to transfer heat between the gas flowing between sub-chambers 1210, 1220, and the gas flowing between sub-chambers 1230, 1240. Accordingly, during the operations of device 1200, in the constant-volume heat-addition process of chamber 110, which is also the constant-volume heat removal process of chamber 120, heat exchanger 1250 can be configured to transfer energy from the gas in the chamber 120 to the gas in the chamber 110, and vice versa. Therefore, by installing heat exchanger 1250 to exchange heat energy between chambers 110, 120 in device 1200, an improved thermal efficiency can be achieved in a complete heat cycle, and a manufacturing cost of device 1200 can be further reduced.

Figure 13:
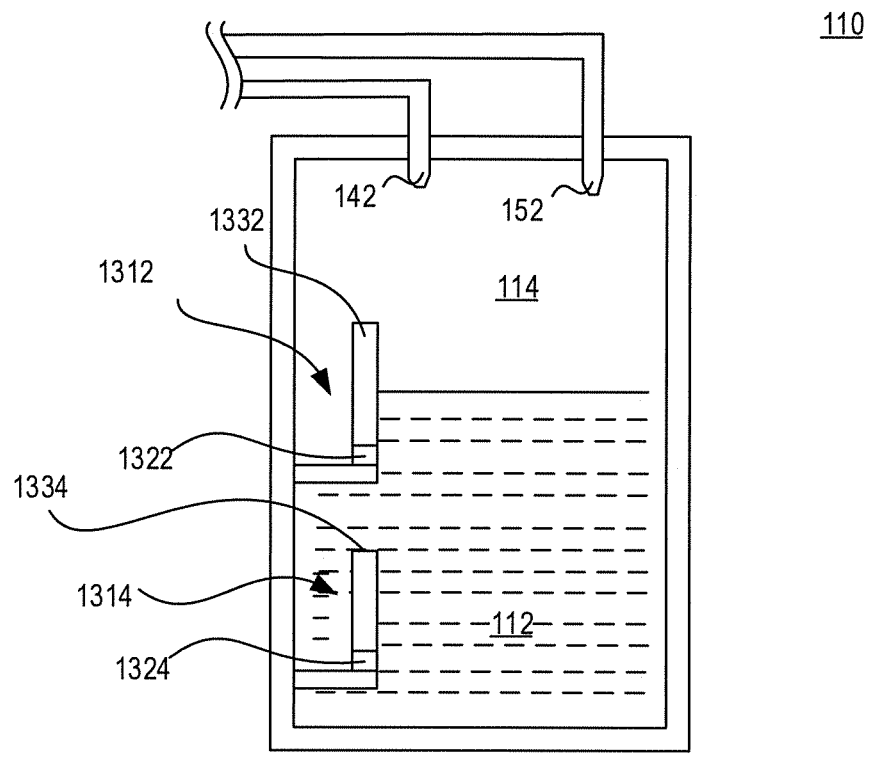

Reference is made to FIG. 13, which illustrates an alternative design of chamber 110, consistent with some embodiments of the present disclosure. In chamber 110 illustrated in FIG. 13, a control valve 1322 is arranged and located at a lower portion of a wall 1332 and configured to selectively open or close a path communicating a partition region 1312 with a main region of chamber 110. Similarly, a control valve 1324 is arranged and located at a lower portion of a wall 1334 and configured to selectively open or close a path communicating a partition region 1314 with the main region of chamber 110. In some embodiments, control valves 1322, 1324 are one-way valves, also known as check valves or non-return valves, such that liquid only flows from partition regions 1312, 1314 into the main region when control valves 1322, 1324 are opened.

When the level of working fluid 112 is higher than wall 1332, working fluid 112 flows into separate partition region 1312. As the level of working fluid 112 falls during the operations, control valve 1322 is configured to provide a flow path in response to a detection that the level of working fluid 112 is lower than control valve 1322, so that working fluid 112 in partition region 1312 flows into the main region accordingly. At this period, heating spray 142 is configured to spray the liquid to heat more gas in space 114. The same operations can be applied to control valve 1324, so that working fluid 112 in partition region 1314 flows into the main region in response to a detection that the level of working fluid 112 is lower than control valve 1324.

On the other hand, when working fluid 112 rises during the operations of chamber 110, since both control valves 1322, 1324 are one-way valves, working fluid 112 flows into separate partition region 1314 after the level of working fluid 112 is higher than wall 1334. Then, working fluid 112 flows into separate partition region 1312 after the level of working fluid 112 is higher than wall 1332.

It should be appreciated that, while two separate partition regions 1312, 1314 are illustrated in the embodiments shown in FIG. 13, various modifications can be made in accordance with actual needs. Those skilled in the art can modify the number of walls and partition regions, as well as locations and arrangements of partition regions, etc., based on requirements in different applications. For example, in some embodiments, instead of being arranged at a side, one or more partition regions can be arranged at a center region of the chamber. Furthermore, size, shape, volume, and/or other characteristics of chambers located in the thermodynamic engine in various embodiments mentioned above can be determined and modified based on different needs in practical applications, such as scale or output power of the thermal energy generation system, the location to build the thermal energy generation system and its geographical constraints or bathyorographic conditions.

Figure 14:
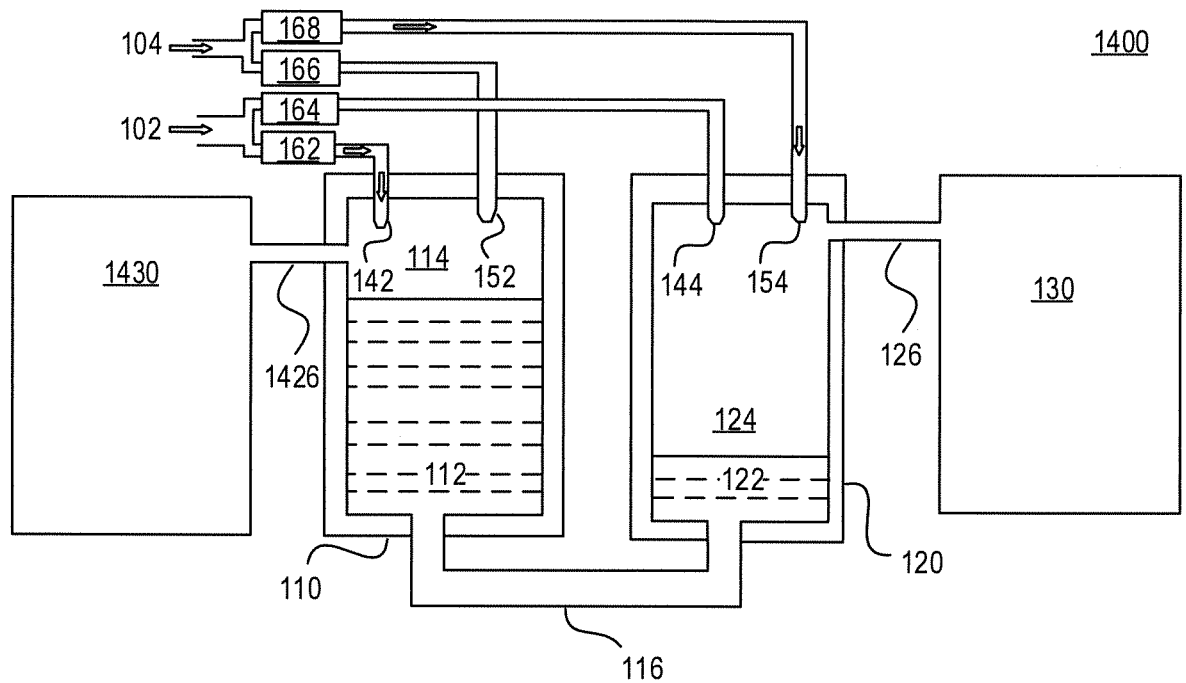
FIG. 14 illustrates an exemplary device to generate power, consistent with some embodiments of the present disclosure.

Reference is made to FIG. 14, which illustrates a device 1400 to generate power, consistent with some embodiments of the present disclosure. Compared to device 100 shown in FIG. 1, device 1400 includes two power-extraction units 130 and 1430 coupled with chambers 120 and 110 respectively. More particularly, power-extraction unit 1430 is coupled with chamber 110 via a flow passage 1426.

Similar to operations in FIG. 1, at least one of the heating and cooling of space 124 causes at least one of a compression or expansion force of space 114. Accordingly, the compression or expansion force of space 114 drives power-extraction unit 1430 coupled with chamber 110. Accordingly, the turbine and the generator can be further connected to power-extraction unit 1430 and driven by gas or by other working fluids outputted from power-extraction unit 1430 to generate electricity, in response to variations in a temperature of space 114 and of space 124. Detailed operations of the power-extraction unit are discussed in various embodiments above.

Figure 15:
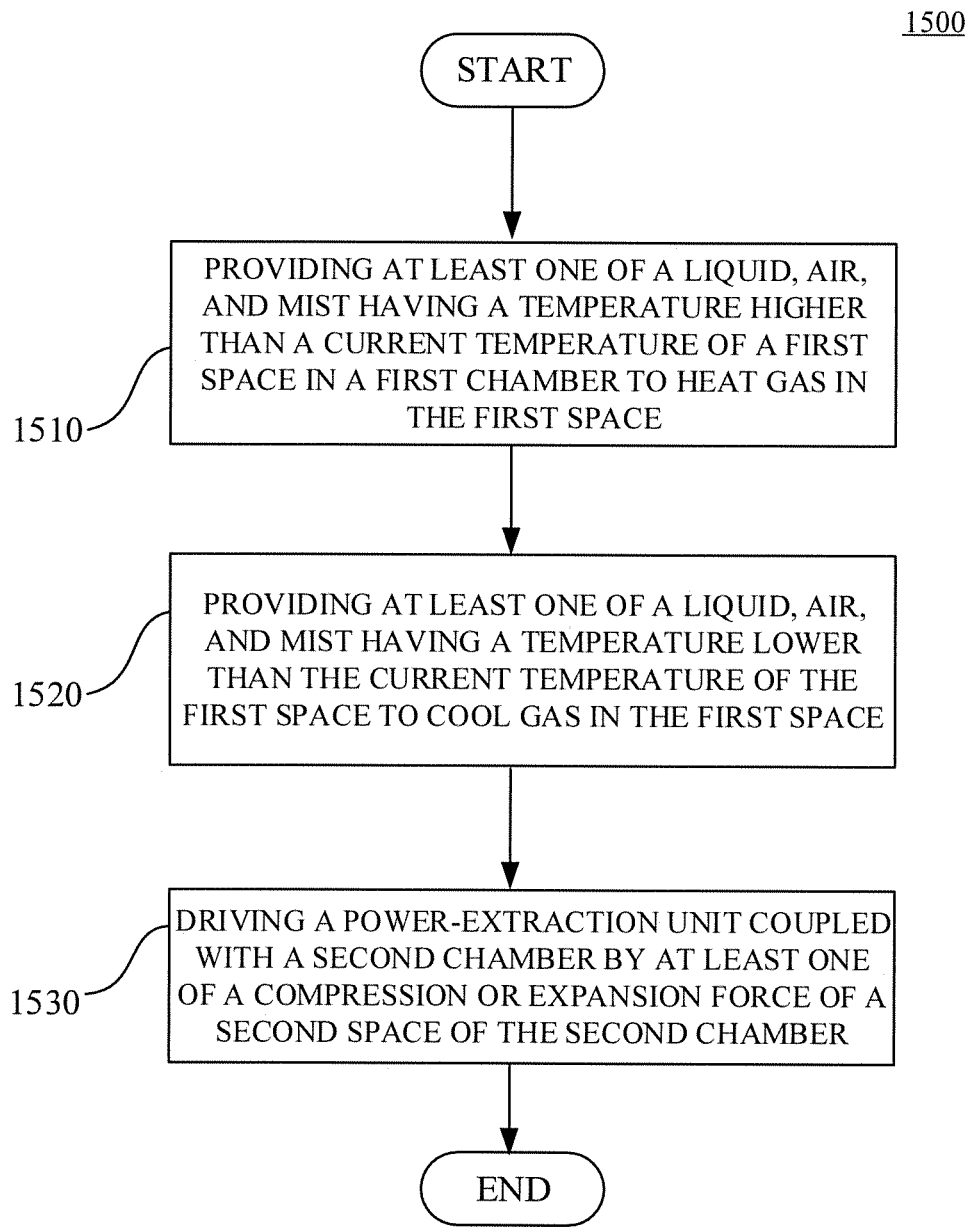
FIG. 15 is a flow chart illustrating an exemplary method for generating power, consistent with some embodiments of the present disclosure.

FIG. 15 is a flow diagram of an exemplary method 1500 for generating power, consistent with some embodiments of the present disclosure. Method 1500 can be performed by a thermodynamic engine (e.g., device 100 in FIG. 1) or an energy generation system (e.g., systems 500, 700 in FIG. 5 and FIG. 7). Method 1500 includes steps S1510, S1520, and S1530.

In step S1510, the thermodynamic engine provides at least one of a liquid, air, and mist having a temperature higher than a current temperature of a first space (e.g., space 114) in a first chamber (e.g., chamber 110) to heat gas in the first space. For example, a first heating spray (e.g., heating spray 142) can spray liquid or mist to heat gas in the first space. In some embodiments, at the same time, the thermodynamic engine can further provide, by a second cooling spray (e.g., cooling spray 154), at least one of a liquid, air, and mist having a temperature lower than a current temperature of a second space (e.g., space 124) in a second chamber (e.g., chamber 120) to cool gas in the second space.

In step S1520, the thermodynamic engine provides at least one of a liquid, air, and mist having a temperature lower than the current temperature of the first space in the first chamber to cool gas in the first space. For example, a first cooling spray (e.g., cooling spray 152) can spray liquid or mist to cool gas in the first space. In some embodiments, at the same time, the thermodynamic engine can further provide, by a second heating spray (e.g., heating spray 144), at least one of a liquid, air, and mist having a temperature higher than a current temperature of the second space in the second chamber to heat gas in the second space.

In step S1530, the thermodynamic engine drives a power-extraction unit (e.g., power-extraction unit 130) coupled with the second chamber by at least one of a compression or expansion force of the second space of the second chamber. More particularly, the compression or expansion force is caused by the heating or cooling of the first space.

By repeating the above operations in steps S1510-S1530, the power-extraction unit can output gas or the working fluid to drive a generator that generates electricity in response to variations in the temperature of the first space and the second space accordingly.

In view of the above, in various embodiments of the present disclosure, the thermodynamic engine can perform energy conversion to transform the energy in a heat source, such as ocean thermal energy, geothermal energy, landfill heat energy, waste heat from industrial processes, etc., in different forms such as potential energy of liquid or kinetic energy of gas, to drive the turbine and generator to produce electricity. The thermodynamic engine in various embodiments achieves a simplified structure having fewer device components and simple pipe arrangements. Therefore, the manufacturing cost and the per unit electricity generation cost can be lowered.

In addition, since the proposed thermodynamic engine can run with low temperature difference between the chambers, it can be widely applied in different thermal energy generation systems which use ocean thermal energy, geothermal energy, landfill heat energy, waste heat from industrial processes, etc., as the heat source. Furthermore, in some embodiments with the high temperature difference between the chambers, the proposed thermodynamic engine may further provide a higher energy conversion efficiency when compared to the conventional thermodynamic engines.

Figure 16:
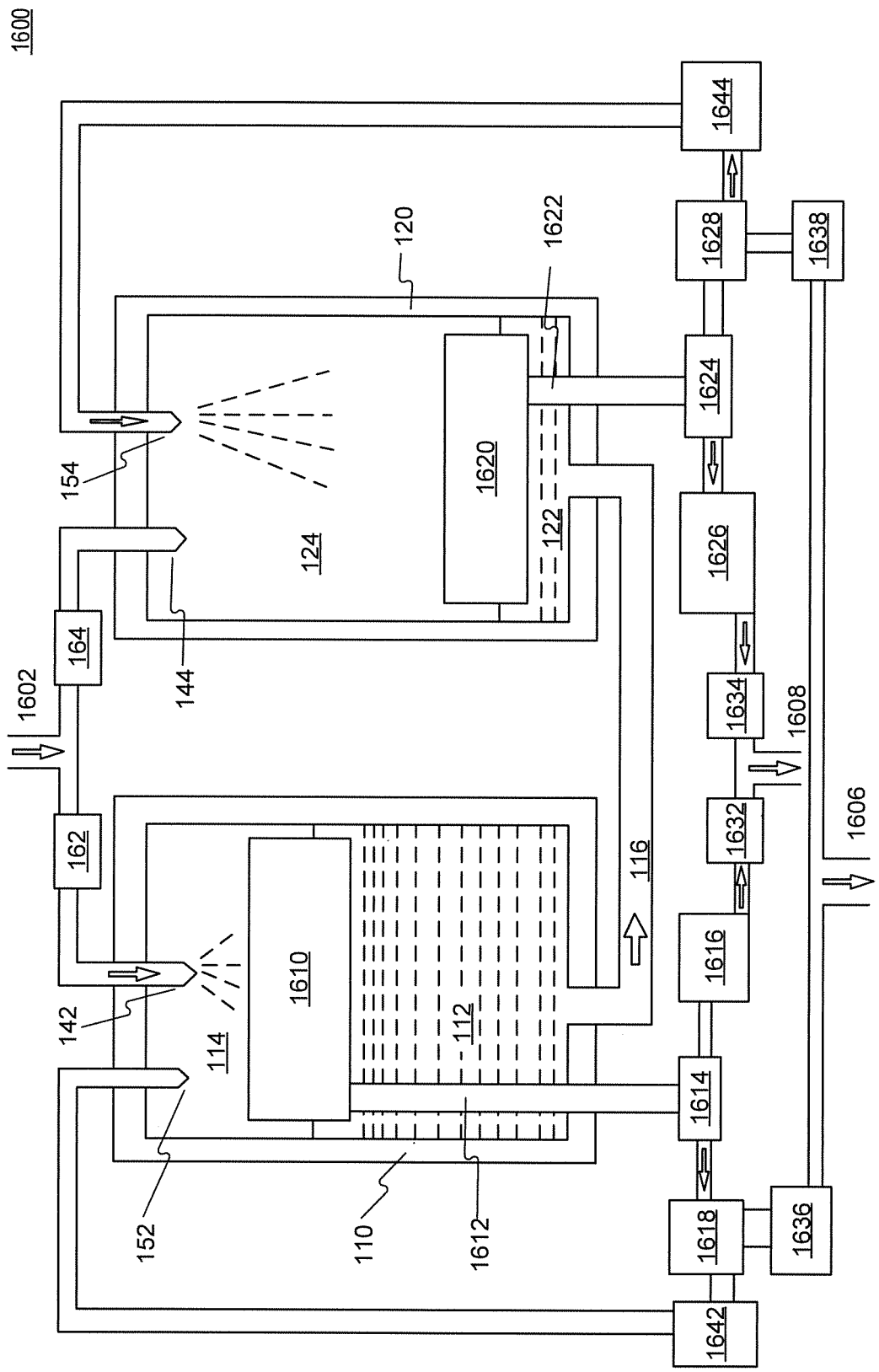
FIG. 16 illustrates an exemplary heat pump device consistent with some embodiments of the present disclosure.

FIG. 16 illustrates an exemplary heat pump device 1600 consistent with some embodiments of the present disclosure. Similar to device 100 in FIG. 1, heat pump device 1600 also includes chambers 110, 120 coupled with each other via flow passage 116. Chamber 110 contains working fluid 112 and a space 114 above a portion of working fluid 112 that is within chamber 110. Similarly, chamber 120 also contains working fluid 122 and a space 124 above a portion of working fluid 122. Examples of gas that would be suitable for use as a working gas in spaces 114, 124 include air, nitrogen, hydrogen, and helium, but the present disclosure is not limited any of those gases. In various embodiments, the working gas in spaces 114 and 124 may be the same or different types of gas and may be a mixture of two or more gases. Working fluid 112, 122 can flow between chamber 110 and chamber 120 via a flow passage 116 and be used as a liquid piston. Examples of liquids that would be suitable for use as working fluid 112, 122 may include water, seawater, their mixture, or any other liquid or liquid mixture. In some embodiments, a liquid that will not or is less likely to change its state when working with working gas in spaces 114, 124 and under the working conditions, such as the temperatures and pressures of heat pump device 1600, may be used.

Heat pump 1600 further includes spray devices, e.g., heating sprays 142, 144 and cooling sprays 152, 154. Heating spray 142 and cooling spray 152 coupled with chamber 110 are configured to heat or cool space 114 in chamber 110, and heating spray 144 and cooling spray 154 coupled with chamber 120 are configured to heat or cool space 124 in chamber 120. In some embodiments, heating sprays 142, 144 and cooling sprays 152, 154 can heat or cool space 114 or 124 by spaying at least one of liquid or gas into chamber 110 or 120.

Compared to device 100 in FIG. 1, Heat pump 1600 further includes liquid collecting devices 1610, 1620, pipes 1612, 1622, control valves 1614, 1624, second liquid tanks 1616, 1626, first liquid tanks 1618, 1628, control valves 1632, 1634, 1636 and 1638, and pumps 1642, 1644.

An input passage 1602 connecting to heating sprays 142, 144 is configured to provide the working fluid having a first temperature. More particularly, as shown in FIG. 16, in a heating process applied to chamber 110, warm liquid from input passage 1602 is pumped by a pump 162 and sprayed through heating spray 142 into space 114 to heat space 114.

On the other hand, in a cooling process applied to chamber 110, cool liquid (e.g., the liquid in liquid tank 1618) is pumped by pump 1642 and sprayed through cooling spray 152 into space 114 to cool space 114. That is, heating spray 142 and cooling spray 152 respectively spray the fluid into chamber 110.

Liquid collecting device 1610 is arranged to float near a surface of the working fluid within chamber 110 and configured to collect at least a portion of the liquid sprayed by heating spray 142 or cooling spray 152. As shown in FIG. 16, pipe 1612 is coupled between liquid collecting device 1610 and control valve 1614, and is configured to provide a path for liquid collected by liquid collecting device 1610. Control valve 1614 is coupled to liquid tank 1616 and liquid tank 1618, and is configured to control the liquid collected by liquid collecting device 1610 to flow into liquid tank 1616 or liquid tank 1618. The temperature of the liquid in the liquid tank 1618 is lower than the temperature of the liquid in liquid tank 1616.

Liquid collecting device 1610 is coupled to cooling spray 152 via pipe 1612, control valve 1614, liquid tank 1618 and pump 1642. In the expansion process of the gas in space 114, warm liquid from input passage 1602 is sprayed through heating spray 142 to heat the gas in space 114 and then collected by liquid collecting device 1610. The liquid on the surface of liquid collecting device 1610 cools down as the heat is transferred to provide the work required as the gas in space 114 expands. The cooled liquid then flows into control valve 1614 via pipe 1612, and control valve 1614 controls the cooled liquid to flow into liquid tank 1618, which is the liquid tank collecting cool liquid.

On the other hand, in the compression process of the gas in space 114, pump 1642 pumps the liquid in liquid tank 1618, and cooling spray 152 is configured to spray the cool liquid stored in liquid tank 1618 to chamber 110 to cool the gas in space 114 and then collected by liquid collecting device 1610. The liquid on the surface of liquid collecting device 1610 absorbs heat as the gas in space 114 compresses. The heated liquid then flows into control valve 1614 via pipe 1612, and control valve 1614 controls the heated liquid to flow into liquid tank 1616, which is the liquid tank collecting warm liquid. Thus, the liquid can be recycled back for reuse after collected by liquid collecting device 1610.

Control valves 1632, 1636 are respectively coupled to liquid tank 1616 and liquid tank 1618. More particularly, control valve 1632 is configured to provide a flow path to discharge the liquid in liquid tank 1616 to an output passage 1608 connecting to liquid collecting devices 1610, 1620. In some embodiments, the working fluid stored in liquid tank 1616 and outputted via output passage 1608 has a temperature higher than the temperature (i.e., the first temperature) of the warm liquid from input passage 1602. On the other hand, control valve 1636 is configured to provide a flow path to discharge the liquid in liquid tank 1618 to another output passage 1606 connecting to liquid collecting devices 1610, 1620. In some embodiments, the working fluid stored in liquid tank 1618 and outputted via output passage 1606 has a temperature lower than the temperature (i.e., the first temperature) of the warm liquid from input passage 1602.

In some embodiments, operations of liquid collecting device 1620, pipe 1622, control valve 1624, second liquid tank 1626, first liquid tank 1628, control valves 1634, 1638, and pump 1644 arranged at the side of chamber 120 are the same or similar to the operations of liquid collecting device 1610, pipe 1612, control valve 1614, liquid tank 1616, liquid tank 1618, control valves 1632, 1636, and pump 1642 arranged at the side of chamber 110, which are discussed in the embodiments above. For example, liquid collecting device 1620 is arranged to float near a surface of the working fluid within chamber 120 and configured to collect at least a portion of the liquid sprayed by heating spray 144 or cooling spray 154. Liquid collecting device 1620 is coupled to cooling spray 154 via pipe 1622, control valve 1624, liquid tank 1628 and pump 1644. Accordingly, in the compression process of the gas in space 124, pump 1644 pumps the liquid in liquid tank 1628, and cooling spray 154 is configured to spray the cool liquid stored in liquid tank 1628 to chamber 120 to cool the gas in space 124 and then collected by liquid collecting device 1620. The liquid on the surface of liquid collecting device 1620 absorbs heat as the gas in space 124 compresses. The heated liquid then flows into control valve 1624 via pipe 1622, and control valve 1624 controls the heated liquid to flow into liquid tank 1626, which is the liquid tank collecting warm liquid. In the expansion process of the gas in space 124, warm liquid from input passage 1602 is sprayed through heating spray 144 to heat the gas in space 124 and then collected by liquid collecting device 1620. The liquid on the surface of liquid collecting device 1620 cools down as the heat is transferred to provide the work required as the gas in space 124 expands. The cooled liquid then flows into control valve 1624 via pipe 1622, and control valve 1624 controls the cooled liquid to flow into liquid tank 1628, which is the liquid tank collecting cool liquid. Thus, the liquid can be recycled back for reuse after collected by liquid collecting device 1620.

Figure 17:
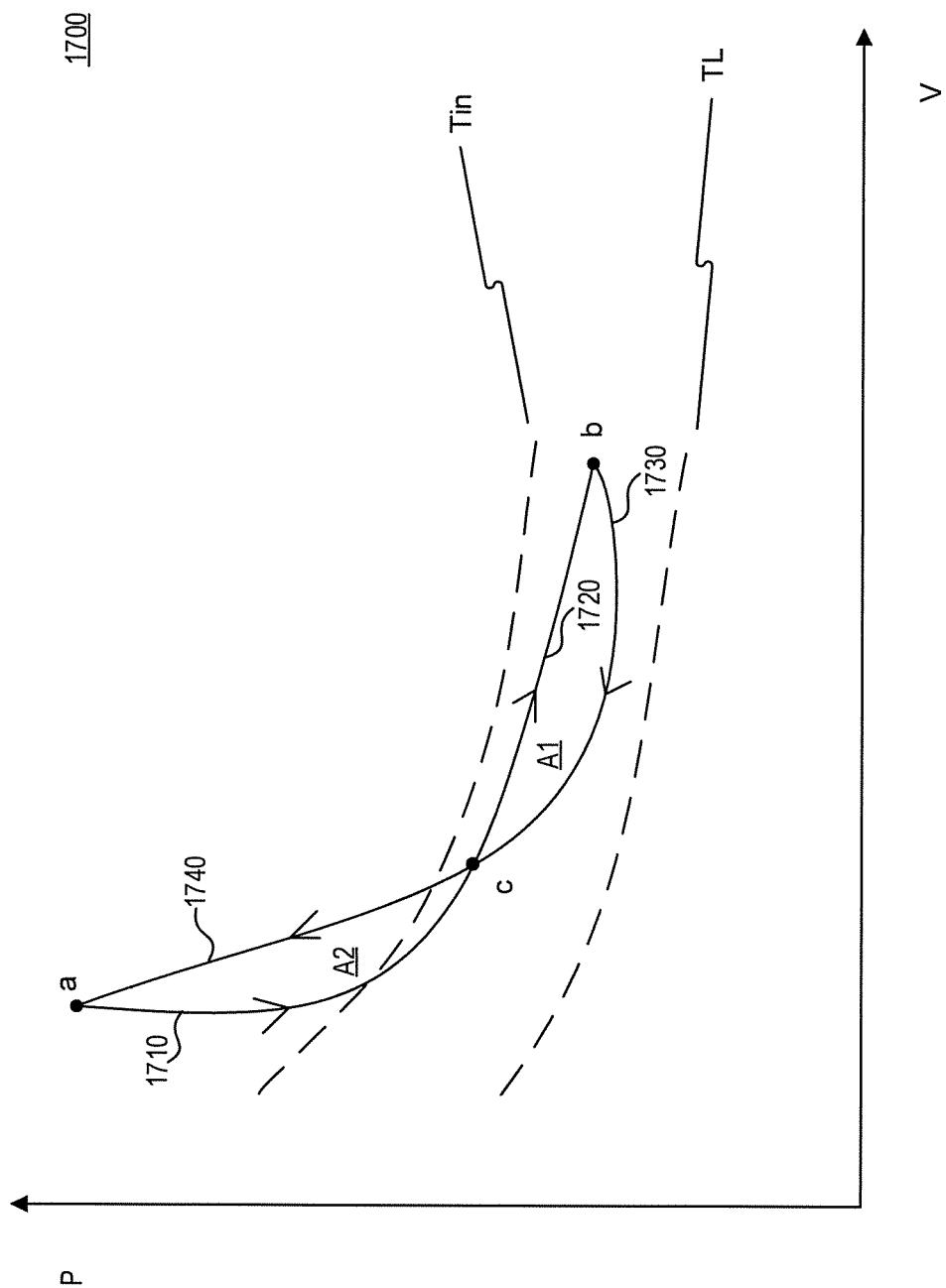
FIG. 17 illustrates a pressure-volume graph of thermodynamic processes acting on the air or gas in spaces of the heat pump device in FIG. 16, consistent with some embodiments of the present disclosure.

Reference is made to FIG. 17. FIG. 17 illustrates a pressure-volume graph 1700 of thermodynamic processes acting on the air or gas in space 114 and 124 of heat pump 1600, consistent with some embodiments of the present disclosure. The horizontal axis denotes the volume of the gas in the chamber, and the vertical axis denotes the pressure of the gas in the chamber.

When space 114 is at operating point A and the surface of working liquid 112 is at a highest point, space 124 is at operating point B and the surface of working liquid 122 is at a lowest point. The curve Tin denotes the constant temperature (isothermal) line of temperature (i.e., the first temperature) of the warm liquid from input passage 1602. The curve TL denotes the constant temperature (isothermal) line of the temperature of the liquid stored in first liquid tanks 1618, 1628.

When the surface of working liquid 112 is at the highest point, pump 1642 is configured to be off and pump 162 is configured to be on to spray the warm liquid through heating spray 142. As the surface of working liquid 112 falls and the gas in space 114 is expanded, the temperature of the collected liquid falls accordingly. Control valve 1614 is configured to connect pipe 1612 to liquid tank 1618 to direct the liquid distributing the heat during expansion from liquid collecting device 1610 into liquid tank 1618.

At the same time, pump 164 is configured to be off and pump 1644 is configured to be on to spray the cool liquid in first liquid tank 1628 through cooling spray 154. The surface of working liquid 122 rises from the lowest point, as the gas in space 124 is compressed, the temperature of the collected liquid rises accordingly. Control valve 1624 is configured to connect pipe 1622 to second liquid tank 1626 to direct the liquid absorbing the heat during the compression from liquid collecting device 1620 into second liquid tank 1626.

Accordingly, during this stage, the operating point of gas in space 114 moves from point A, point C, to point B through curves 1710 and 1720, which represents an expansion process. The operating point of gas in space 124 moves from point B, point C, to point A through curves 1730 and 1740, which represents a compression process.

When the surface of working liquid 122 reaches the highest point, pump 1644 is configured to switch off and pump 164 is configured to switch on to spray the warm liquid through heating spray 144. As the surface of working liquid 122 starts to fall and the gas in space 124 is expanded, the temperature of the collected liquid falls accordingly. Control valve 1624 is configured to connect pipe 1622 to first liquid tank 1628 to direct the liquid distributing the heat during expansion from liquid collecting device 1620 into first liquid tank 1628.

Similar to the operations above, pump 162 is configured to switch off and pump 1642 is configured to switch on to spray the cool liquid in liquid tank 1618 through cooling spray 152. The surface of working liquid 112 rises from the lowest point, as the gas in space 114 is compressed, the temperature of the collected liquid rises accordingly. Control valve 1614 is configured to connect pipe 1612 to liquid tank 1616 to direct the liquid absorbing the heat during the compression from liquid collecting device 1610 into liquid tank 1616.

Accordingly, during this stage, the operating point of gas in space 124 moves from point A, point C, to point B through curves 1710 and 1720, which represents an expansion process. The operating point of gas in space 114 moves from point B, point C, to point A through curves 1730 and 1740, which represents a compression process. Accordingly, as the gas in space 114 and 124 goes through the expansion and compression process, a cycle completes. Area A1 bounded by curves 1720 and 1730 denotes the positive output work, while area A2 bounded by curves 1710 and 1740 denotes the negative output work. To enable the operation in one embodiment, area A1 is larger than area A2. In some embodiments, the size of area A1 depends on the amount of liquid sprayed in the expansion process of space 114, 124. The more the warm liquid heat pump 1600 sprays in the expansion process, the larger the size of area A1 is. In addition, the size of area A2 depends on the amount of liquid sprayed in the compression process of space 114, 124. The more the cool liquid heat pump 1600 sprays in the compression process, the smaller the size of area A2 is.

More particularly, the difference between the temperature of the warm liquid from input passage 1602 and the temperature of the liquid stored in first liquid tanks 1618, 1628 depends on the amount of liquid sprayed in the expansion process of space 114, 124. More particularly, the more liquid is sprayed in the expansion process, the less temperature difference exists. On the other hand, the temperature of the liquid outputted via output passage 1608 depends on the amount of liquid sprayed in the compression process of space 114, 124.

For example, in some embodiments, 100 kg of liquid at 20 degrees Celsius is sprayed in the expansion process, and 100 kg of liquid at 0 degree Celsius is collected after the expansion. Ideally, the heat absorbed equals to the heat produced. Accordingly, if 50 kg of liquid at 0 degrees Celsius is sprayed in the compression process, 50 kg of liquid at 40 degrees Celsius can be collected. Realistically, due to certain heat/energy loss, the hot liquid collected in heating liquid tank 1616 and outputted via output passage 1608 is likely to be slightly lower than 40 degrees Celsius. The example here can be calculated using the following heat transfer equation:

$$Q = M_E \cdot C_{pE} \cdot (T_{Ein} - T_{Eout}) = M_C \cdot C_{pC} \cdot (T_{Cout} - T_{Cin}),$$

where $T_{Ein}$ and $T_{Eout}$ respectively denote the inlet and outlet temperatures of the liquid sprayed in the expansion process, and $T_{Cin}$ and $T_{Cout}$ respectively denote the inlet and outlet temperatures of the liquid sprayed in the compression process. $M_E$ and $M_C$ respectively denote mass of liquid sprayed in the expansion process and of liquid sprayed in the compression process. $C_{pE}$ and $C_{pC}$ denote the heat capacity of the liquid.

Figure 18:
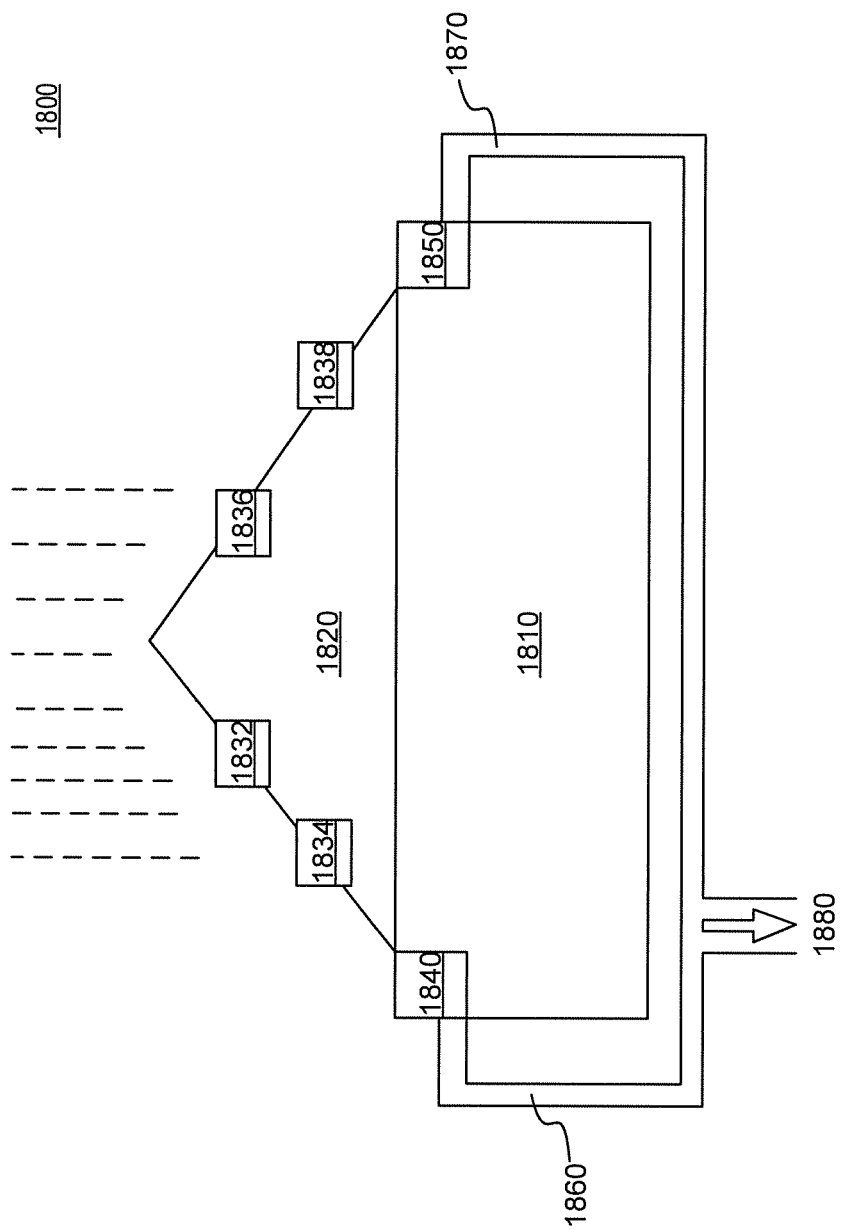
FIG. 18 illustrates an exemplary liquid collecting device consistent with some embodiments of the present disclosure.

For ease of understanding, an exemplary structure of liquid collecting devices 1610, 1620 is described in detail with FIG. 18 below. FIG. 18 illustrates an exemplary liquid collecting device 1800, consistent with some embodiments of the present disclosure. As shown in FIG. 18, in some embodiments, liquid collecting device 1800 includes a base portion 1810 and at least one convex portion 1820 extending axially from base portion 1810.

In some embodiments, base portion 1810 is configured to float near a liquid surface, e.g., the liquid surface of working liquid 112 or 122. The liquid sprayed from heating sprays 142, 144 or cooling sprays 152, 154 will fall and flow along the surface of convex surface 1820. Pipes 1860 and 1870 are arranged near bottom portions 1840, 1850 of convex surface 1820, and configured to accept the liquid collected by convex surface 1820 and output the collect liquid via an output terminal 1880. Accordingly, the design of liquid collecting device 1800 illustrated in FIG. 18 can be used to collect the sprayed liquid and applied in various embodiments to achieve liquid collecting devices 1610 or 1620 shown in FIG. 16.

In addition, in some embodiments, the amount of the liquid sprayed may vary in the expansion or compression process. For example, during the expansion process, the spray rate may decrease gradually so that the amount of the liquid sprayed in the same time interval decreases. On the other hand, during the compression process, the spray rate may increase gradually so that the amount of the liquid sprayed in the same time interval increases, which may improve the heat exchange efficiency.

Figure 19:
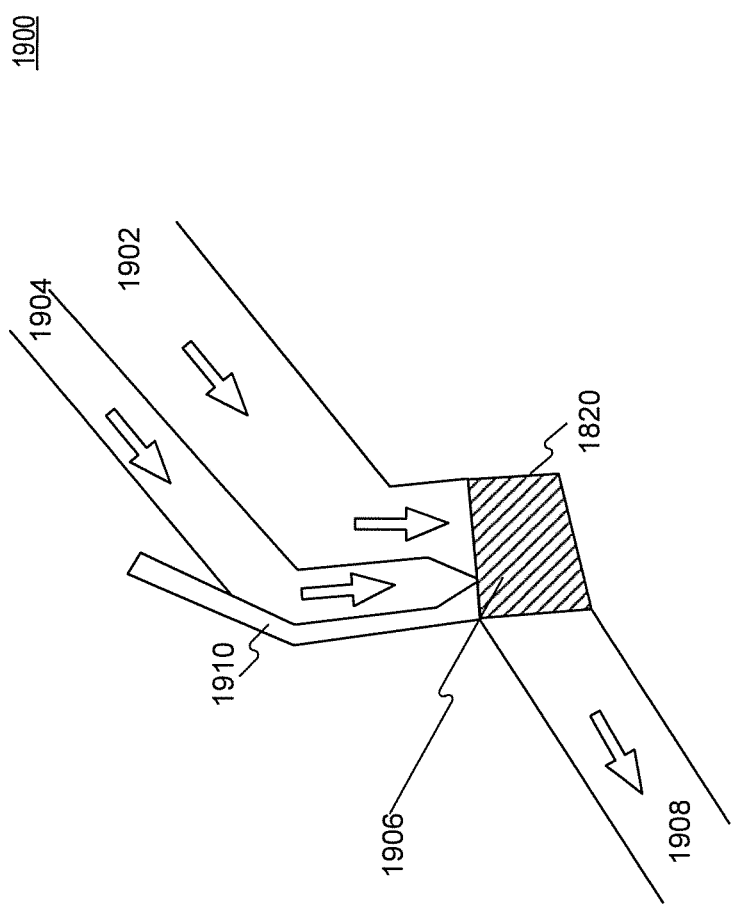
FIG. 19 illustrates an exemplary mixing structure consistent with some embodiments of the present disclosure.

In addition, as shown in FIG. 18, in some embodiments, liquid collecting device 1800 may further include at least one flow-directing structure 1832, 1834, 1836, 1838 located on convex surface 1820 and configured to direct the flow of the liquid flowing through convex surface 1820. Reference is made to FIG. 19, which illustrates an exemplary flow-directing structure 1900, consistent with some embodiments of the present disclosure.

As shown in FIG. 19, in some embodiments, flow-directing structure 1900 includes a plate 1910 fixed to the surface of the convex surface 1820. Before encountering plate 1910, the liquid on the surface of the convex surface 1820 may have a relatively low temperature homogeneity, in which lower part liquid 1902 absorbs or distributes less heat than upper-part liquid 1904 does. When encountering plate 1910, lower part liquid 1902 and upper-part liquid 1904 change the flowing direction and are mixed in a mixing area 1906. After the mixing, liquid 1908 having a relatively high temperature homogeneity continues to flow along the surface of the convex surface 1820.

Accordingly, by deploying one or more flow-directing structures 1900 on convex surface 1820, the temperature homogeneity of the liquid may be increased, which improves the heat exchange in chambers 110, 120 and the overall efficiency of heat pump 1600.

Figure 20:
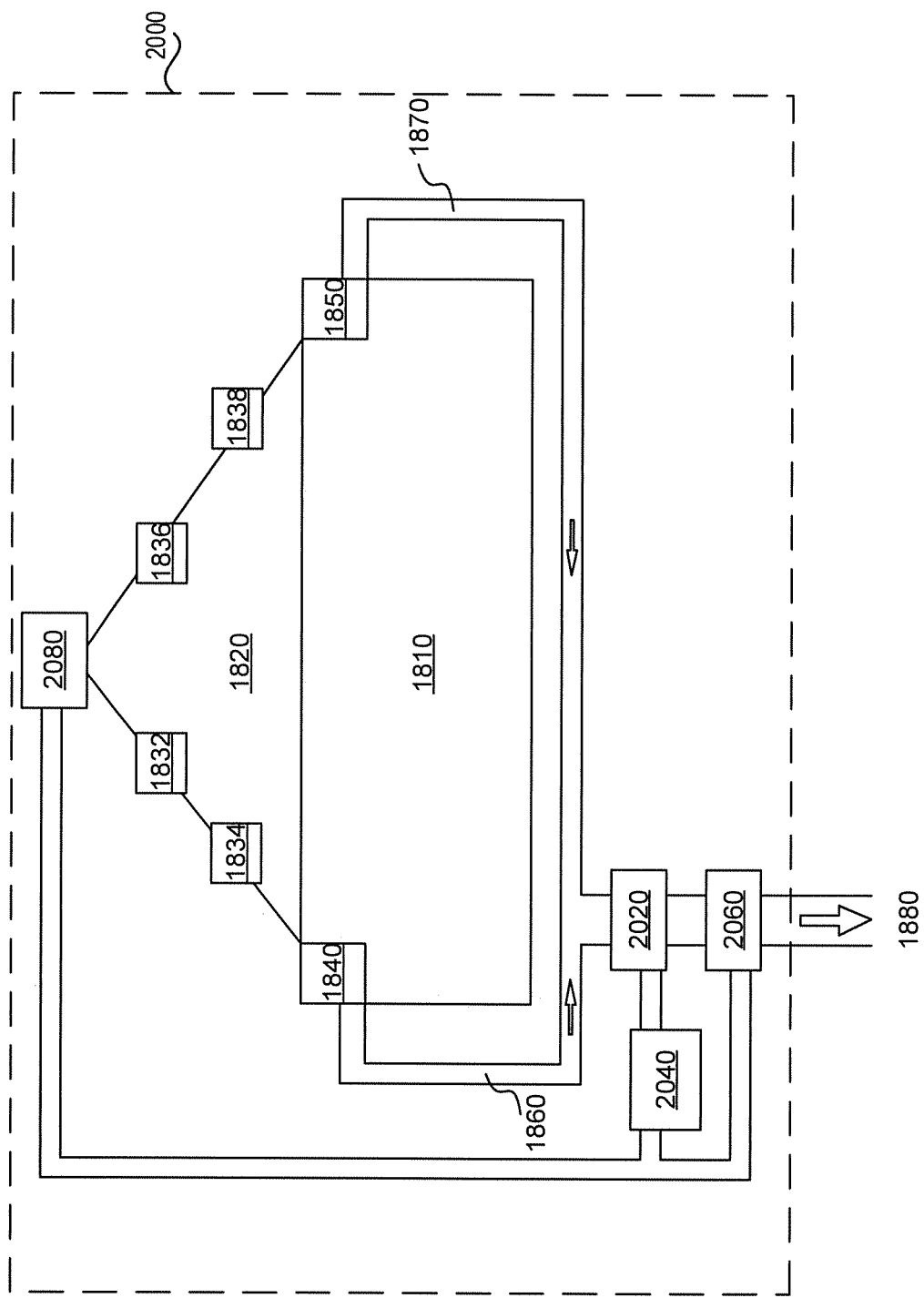
FIG. 20 illustrates an exemplary liquid collecting device consistent with some embodiments of the present disclosure.

FIG. 20 illustrates an exemplary liquid collecting device 2000, consistent with some embodiments of the present disclosure. As shown in FIG. 20, in some embodiments, compared to liquid collecting device 1800 in FIG. 18, liquid collecting device 2000 further includes a container 2020, a pump 2040, a control valve 2060, and a container 2080 arranged above convex surface 1820.

During the expansion or compression process, control valve 2060 is off and configured to block the path to discharge the liquid via output terminal 1880. Accordingly, the collected liquid flowing through pipes 1860, 1870 is stored in container 2020 coupled to pipes 1860, 1870. Pump 2040 coupled between container 2020 and container 2080 is on and configured to pump the liquid in container 2020 back to container 2080. Then, the liquid flows through one or more holes located at the bottom of container 2080 to the surface of convex portion 1820. Then, when the expansion or compression process is about to e, pump 2040 is turned off and control valve 2060 is on and configured to provide the flow path to discharge the liquid in the container 2020, via output terminal 1880, to the cooling liquid tank (e.g., cooling liquid tank 1618, 1628) or the heating liquid tank (e.g., heating liquid tank 1616, 1626). Accordingly, the liquid may be reused during expansion or compression to produce additional output or improve energy conversion efficiency.

It is noted that liquid collecting devices 1800 and 2000 illustrated in FIG. 18 and FIG. 20 are merely examples and are not meant to limit the present disclosure. It will be apparent to those skilled in the art that various modifications and variations can be made to liquid collecting devices 1610 or 1620. For example, in some embodiments, liquid collecting device 1800 may include multiple convex surfaces 1820 on one base portion 1810.

Figure 21:
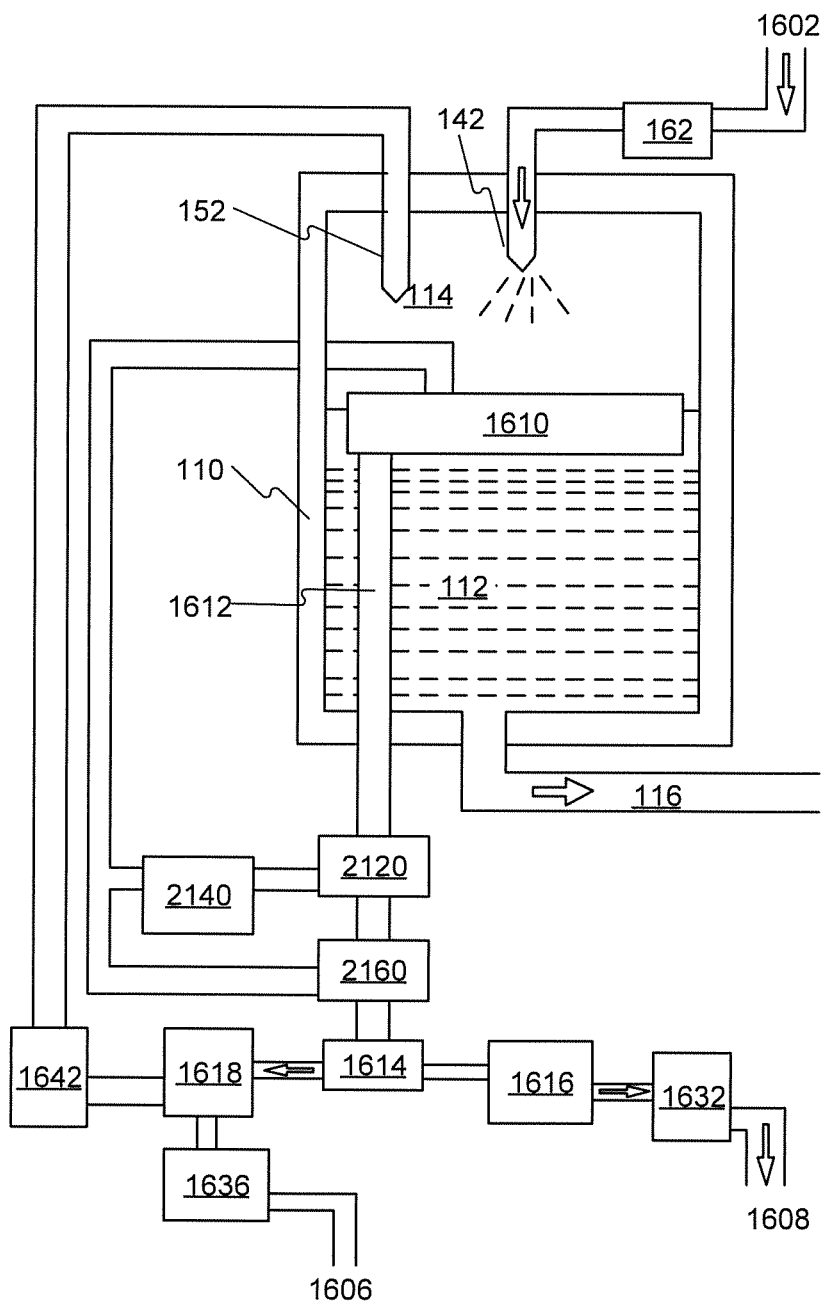
FIG. 21 illustrates alternative designs of a heat pump device consistent with some embodiments of the present disclosure.

In some embodiments, container 2020, pump 2040, control valve 2060 may be arranged outside from liquid collecting device 2000 and may be independent components in heat pump 1600. Reference is made to FIG. 21, which illustrates alternative designs of a heat pump 2100, consistent with some embodiments of the present disclosure. As shown in FIG. 21, heat pump 2100 further includes container 2120, pump 2140, and control valve 2160 deployed externally to chamber 110. Operations of container 2120, pump 2140, and control valve 2160 are similar to those of container 2020, pump 2040, and control valve 2060 described in above embodiments.

During the expansion or compression process, control valve 2160 is off and configured to block the flow path to discharge the liquid. Pump 2140 is configured to pump the liquid in container 2120 back to liquid collecting device 1610 (e.g., to container 2080 arranged above convex surface 1820 in liquid collecting device 1610) to reuse the liquid for heat exchange. When the expansion or compression process is about to terminate, control valve 2160 is on and configured to discharge the liquid, via control valve 1614, to liquid tank 1616 or liquid tank 1618 selectively under the control of control valve 1614. Accordingly, heat pump 2100 may produce more work and improve the energy conversion efficiency.

Figure 22:
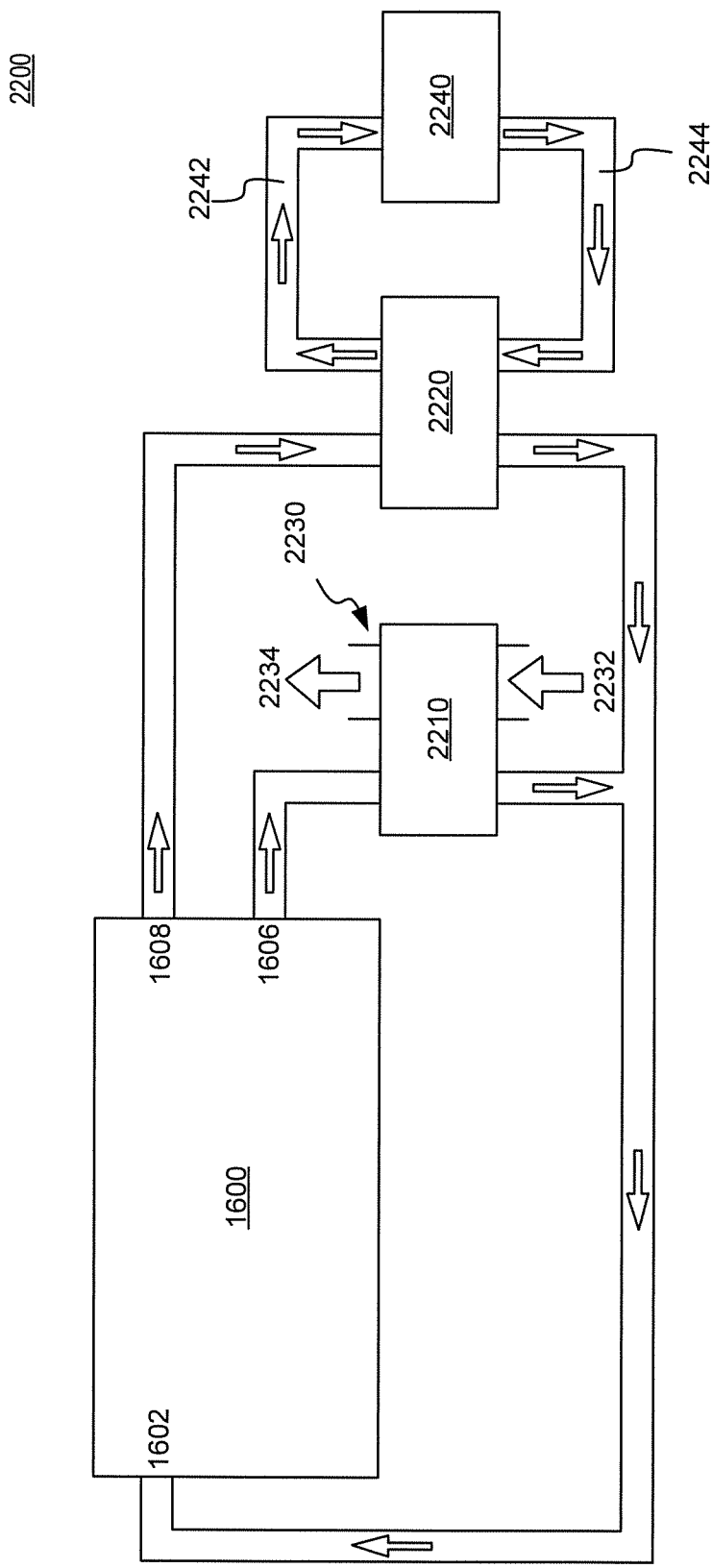
FIG. 22 illustrates a heat exchanging system consistent with some embodiments of the present disclosure.

Reference is made to FIG. 22, which illustrates a heat exchanging system 2200 consistent with some embodiments of the present disclosure. In some embodiments, heat exchanging system 2200 can be applied in an air conditioning (HVAC) devices or a chilled-water system. As shown in FIG. 22, heat exchanging system 2200 includes heat pump 1600, heat exchangers 2210, 2220, and a cooling tower 2240 configured to cool the liquid. As discussed in above embodiments, heat pump 1600 is configured to receive warm liquid (e.g., the liquid having the first temperature) from input passage 1602, to output the cool liquid (e.g., the liquid having a temperature lower than the first temperature) from output passage 1606, and to output the hot liquid (e.g., the liquid having a temperature higher than the first temperature) from output passage 1608.

In some embodiments, heat exchanger 2210 is coupled with output passage 1606 of heat pump 1600 and with a gas pipe 2230. Heat exchanger 2210 is configured to transfer heat between the air flowing through gas pipe 2230 and the working liquid flowing from output passage 1606. The cool liquid from output passage 1606 absorbs the heat from the air flow in gas pipe 2230, and the temperature of the air flow provided via an outlet air passage 2234 of gas pipe 2230 is lower than the temperature of the air flow received via an inlet air passage 2232 of gas pipe 2230. After the heat exchange, the temperature of the liquid rises, and the liquid is then is circulated back to heat pump 1600 via input passage 1602. Accordingly, heat exchanging system 2200 may produce the cooling air in a circulation system and can be used in various applications, such as a large-scale air-conditioning system.

In some embodiments, heat exchanger 2220 is coupled with output passage 1608 of heat pump 1600 and with cooling tower 2240. Heat exchanger 2220 is configured to transfer heat between the working liquid flowing from output passage 1608 and a liquid flowing from cooling tower 2240 via pipes 2242, 2244. Accordingly, the hot liquid is cooled down after flowing through heat exchanger 2220 and then is circulated back to heat pump 1600 via input passage 1602.

By applying heat pump 1600, mechanical energy is generated using the temperature difference, and then be used as the energy to accomplish the work of transferring energy from a heat source to a heat sink. Thus, compared to traditional systems, in heat exchanging system 2200 using heat pump 1600, the electricity required for the heat transfer and for the total system can be reduced. Accordingly, heat exchanging system 2200 can achieve an energy-saving and cost-efficient design for space heating or space cooling.

Figure 23:
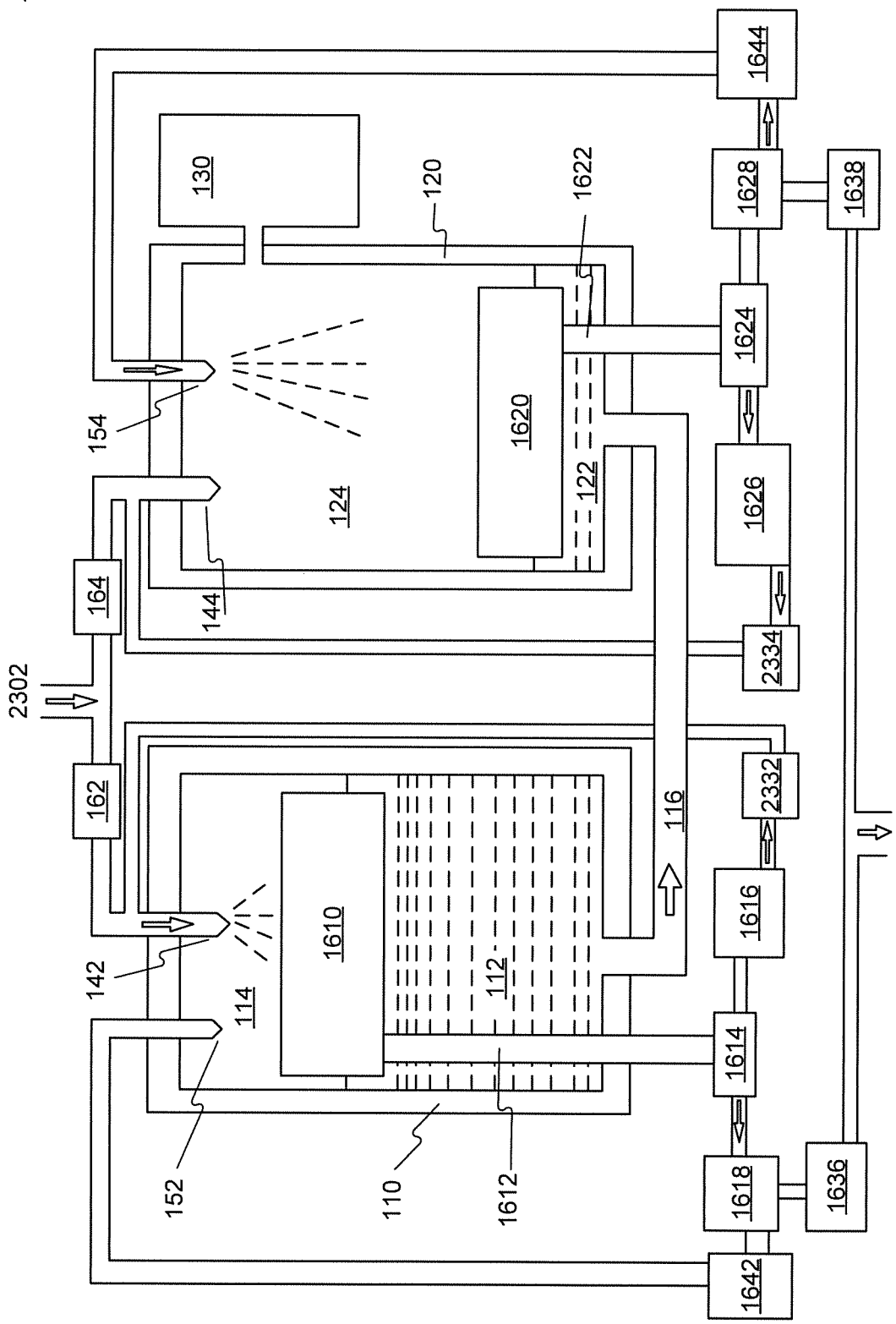
FIG. 23 illustrates an exemplary device to generate power consistent with some embodiments of the present disclosure.

In some embodiments, liquid collecting devices 1610, 1620 can also be applied in device to generate power. Reference is made to FIG. 23, which illustrates an exemplary device 2300 to generate power, consistent with some embodiments of the present disclosure. Similar to device 100 in FIG. 1, device 2300 also includes chambers 110, 120 coupled with each other via a flow passage 116, and a power-extraction unit 130 coupled with chamber 120. Detailed operations of power-extraction unit 130 are discussed in various embodiments above.

Compared to device 100 in FIG. 1, liquid collecting devices 1610, 1620 are deployed in chambers 110, 120 of device 2300 to collect the liquid sprayed from heating sprays 142, 144 or cooling sprays 152, 154. Detailed operations of liquid collecting devices 1610, 1620 are also discussed in various embodiments above. By the design similar to heat pump 1600 in FIG. 16, hot liquid and cool liquid collected by liquid collecting devices 1610, 1620 can be respectively stored in second liquid tanks 1616, 1626 and first liquid tanks 1618, 1628.

Accordingly, instead of receiving both warmer seawater and cooler seawater from two different input terminal, device 2300 can receive warm seawater from a single input passage 2302 of device 2300 to produce the liquid having different temperature during the cycles of the expansion and compression process in chambers 110, 120. In addition, control valves 1636 and 1638 respectively coupled with first liquid tanks 1618, 1628 are configured to control a passage for discharging the working fluid from first liquid tanks 1618, 1628 to an output passage 2304 of device 2300. Therefore, while seawater is sprayed into chambers 110, 120 during the operations, by discharging same amount of the seawater, the total volume of the working fluid in device 2300 remains constant.

By pumping the liquid using pumps 2332, 2334, 1642, 1644, which are respectively coupled to heating sprays 142, 144 and cooling sprays 152, 154, heating sprays 142, 144 and cooling sprays 152, 154 can respectively spray the liquid stored in second liquid tanks 1616, 1626 and first liquid tanks 1618, 1628 to chambers 110, 120 to achieve similar operations of device 100 in FIG. 1. In some embodiments, the liquid stored in second liquid tanks 1616, 1626 may be the primary heating liquid source for heating the gas in space 114 and 124, warm seawater from input passage 2302 may be the auxiliary heating liquid source if the liquid stored in second liquid tanks 1616, 1626 is insufficient to maintain the system.

Thus, device 2300 may cause at least one of a compression or expansion force of space 124, which drives power-extraction unit 130 coupled with chamber 120. Accordingly, a turbine and a generator connected to power-extraction unit 130 can be driven by gas or by other working fluids outputted from power-extraction unit 130 to generate electricity, in response to variations in a temperature of space 114 and of space 124. Detail operations of device 2300 are described in detail in above embodiments.

It is noted that while both heat pump 1600 and device 2300 to generate power utilizing heating sprays 142, 144 and cooling sprays 152, 154 to spray heating liquid and cooling liquid, a ratio of the amount of cooling liquid to the amount of heating liquid may be designed differently according to needs. For example, heat pump 1600 having a lower ratio of the amount of cooling liquid to the amount of heating liquid can produce the heating liquid with higher temperature. On the other hand, for device 2300 to generate power, the temperature of the recycled liquid can be equal to the temperature of the inputted liquid (e.g., warm seawater). Thus, in some embodiments, the ratio of the amount of cooling liquid to the amount of heating liquid may be approximately 1 minus the thermal efficiency, but less than this value due to the heat loss.

Figure 24:
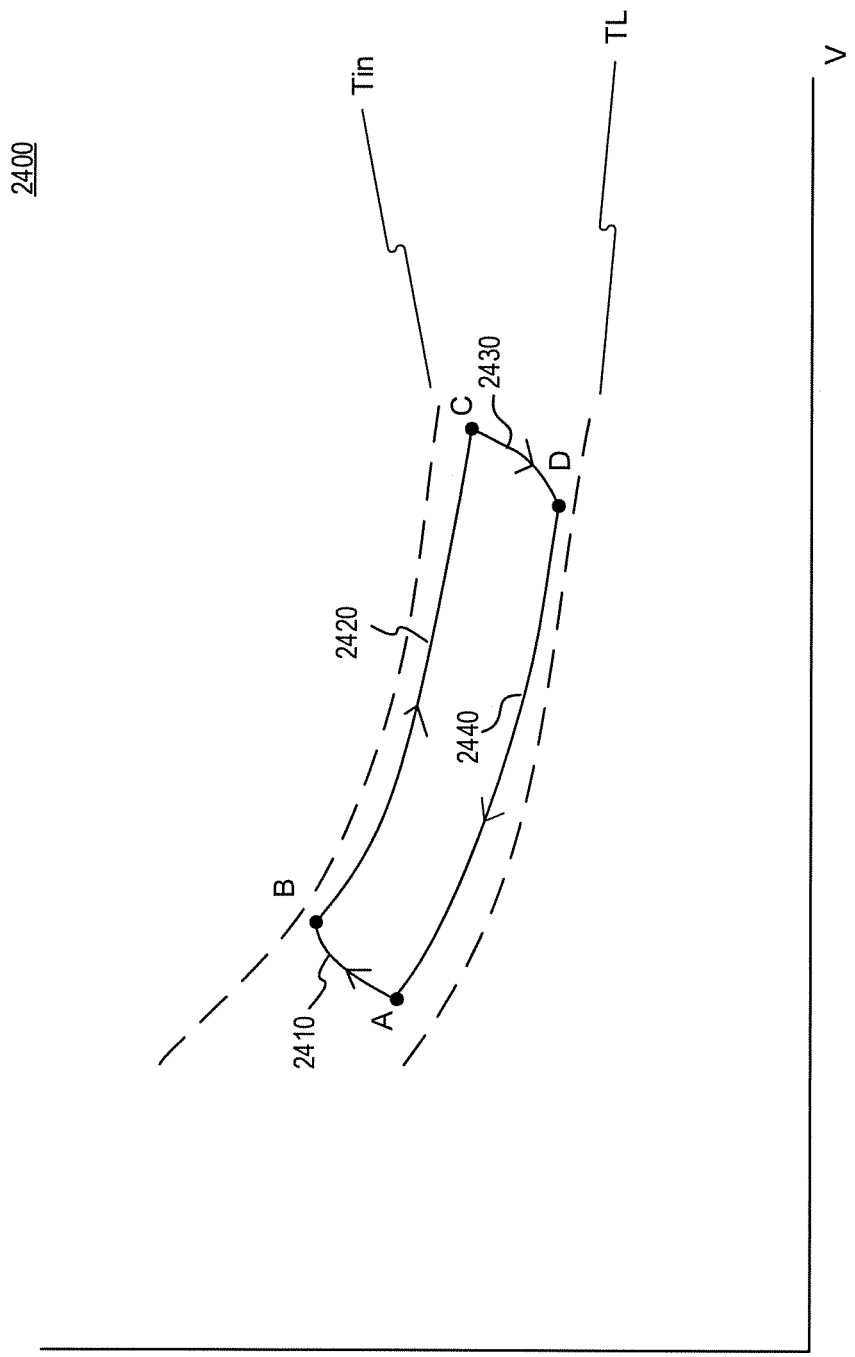
FIG. 24 illustrates a pressure-volume graph of four thermodynamic processes in a Stirling cycle acting on the air or gas in spaces of the device in FIG. 23, consistent with some embodiments of the present disclosure.

Reference is made to FIG. 24. FIG. 24 illustrates a pressure-volume graph 2400 of four thermodynamic processes in a Stirling cycle acting on the air or gas in space 114 and 124 of device 2300 in FIG. 23, consistent with some embodiments of the present disclosure. The horizontal axis denotes the volume of the gas in the chamber, and the vertical axis denotes the pressure of the gas in the chamber. The curve Tin denotes the constant temperature (isothermal) line of temperature of the liquid sprayed by heating sprays 142, 144. The curve TL denotes the constant temperature (isothermal) line of the temperature of the liquid sprayed by cooling sprays 152, 154.

As shown in FIG. 24, in the first half cycle, the operating point of gas in space 114 moves from point A, point B to point C through curves 2410, 2420, which represents an expansion process. On the other hand, the operating point of gas in space 124 moves from point C, point D to point A through curves 2430, 2440, which represents a compression process. In the second half cycle, the operating point of gas in space 114 moves from point C, point D to point A through curves 2430, 2440, which represents a compression process. On the other hand, the operating point of gas in space 124 moves from point A, point B to point C through curves 2410, 2420, which represents an expansion process.

Figure 25:
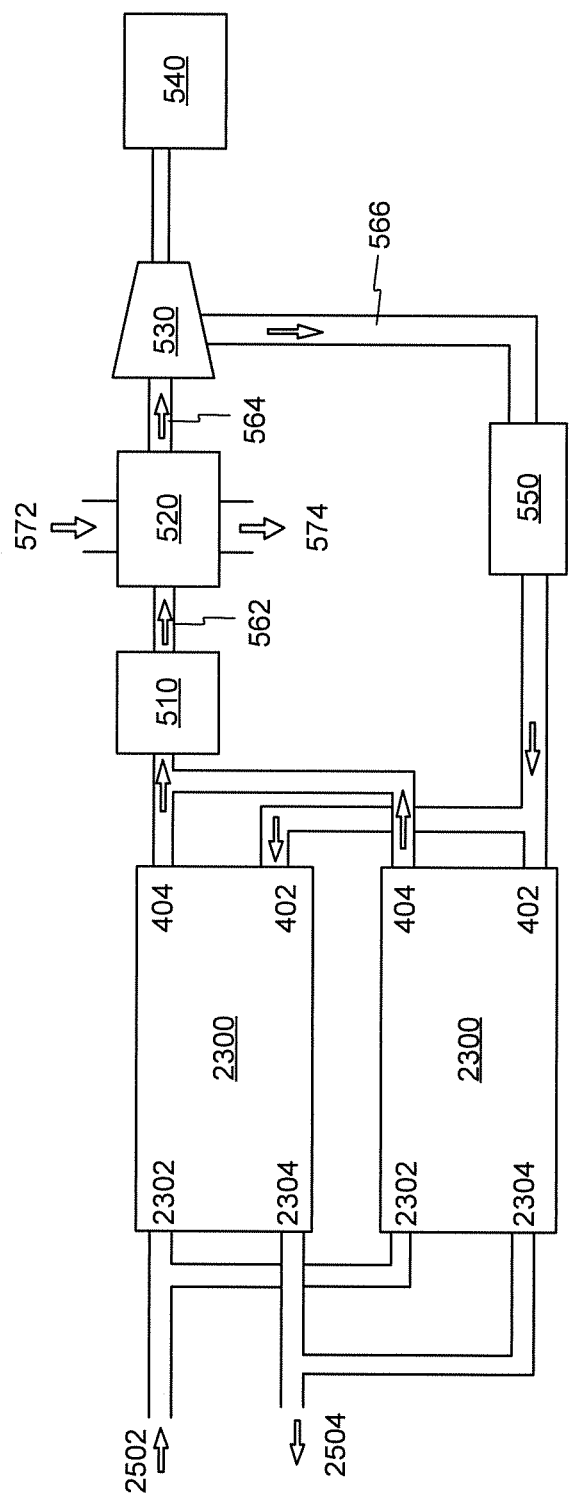
FIG. 25 illustrates an exemplary OTEC system, consistent with some embodiments of the present disclosure.

Reference is made to FIG. 25, which illustrates an exemplary ocean thermal energy conversion (OTEC) system 2500, consistent with some embodiments of the present disclosure. As shown in FIG. 25, OTEC system 2500 includes two devices 2300 in FIG. 23 connected in parallel, an input terminal 2502, and a discharging terminal 2504. Similar to OTEC system 500 in FIG. 5, OTEC system 2500 also includes high-pressure tank 510, heating device 520, turbine engine 530, generator 540, and low-pressure tank 550, of which operations are similar to those discussed in embodiments of FIG. 5. It is noted that OTEC system 2500 illustrated in FIG. 25 is an example and not meant to limit the present disclosure. In some embodiments, OTEC system 2500 may include three or more devices 2300 connected in parallel.

Input terminal 2502 is configured to receive warmer shallow or surface seawater and connected to input passages 2302 of devices 2300. Discharging terminal 2504 is configured to discharge seawater after use and connected to output passages 2304 of devices 2300.

When devices 2300 in OTEC system 2500 output the gas with high pressure from output terminals 404, as described in the operations illustrated in FIG. 4A and FIG. 4B, the outputted gas is fed into high-pressure tank 510 and then provided, via pipe 562, to heating device 520. Heating device 520 is configured to heat the gas using the warm seawater or other heat source, in which terminals 572 and 574 are the input and output terminals of the heat source. The heated gas is then provided, via a pipe 564, to turbine engine 530 and drives turbine engine 530 to output mechanical power for generator 540 to generate electricity. After passing through turbine engine 530, the gas with lower pressure discharges through an exhaust of turbine engine 530 and is provided, via pipe 566, to low-pressure tank 550. Therefore, low pressure gas can be circulated back into devices 2300 via input terminals 402 connected to low-pressure tank 550 for the use in the following cycle. It is noted that, in some embodiments, multiple devices 2300 in OTEC system 2500 can output high pressure gas in different phases correspondingly. Therefore, the variation of pressure can be reduced in order to provide a stable output with lower fluctuation.

By utilizing multiple devices 2300 as the thermodynamic engine, OTEC system 2500 can achieve a simplified structure with fewer device components and simple pipe arrangements. Therefore, a lower manufacturing cost can be guaranteed when compared to those using conventional thermodynamic engines, and the per unit electricity generation cost can be reduced. Further, compared to OTEC system 500 in FIG. 5, only the warm seawater is required in OTEC system 2500, which brings more flexibilities for selecting suitable locations for OTEC system installation. Since OTEC system 2500 can produce cool water itself, it can be located at any unfrozen near-shore or offshore region where warm seawater can be obtained.

Figure 26:
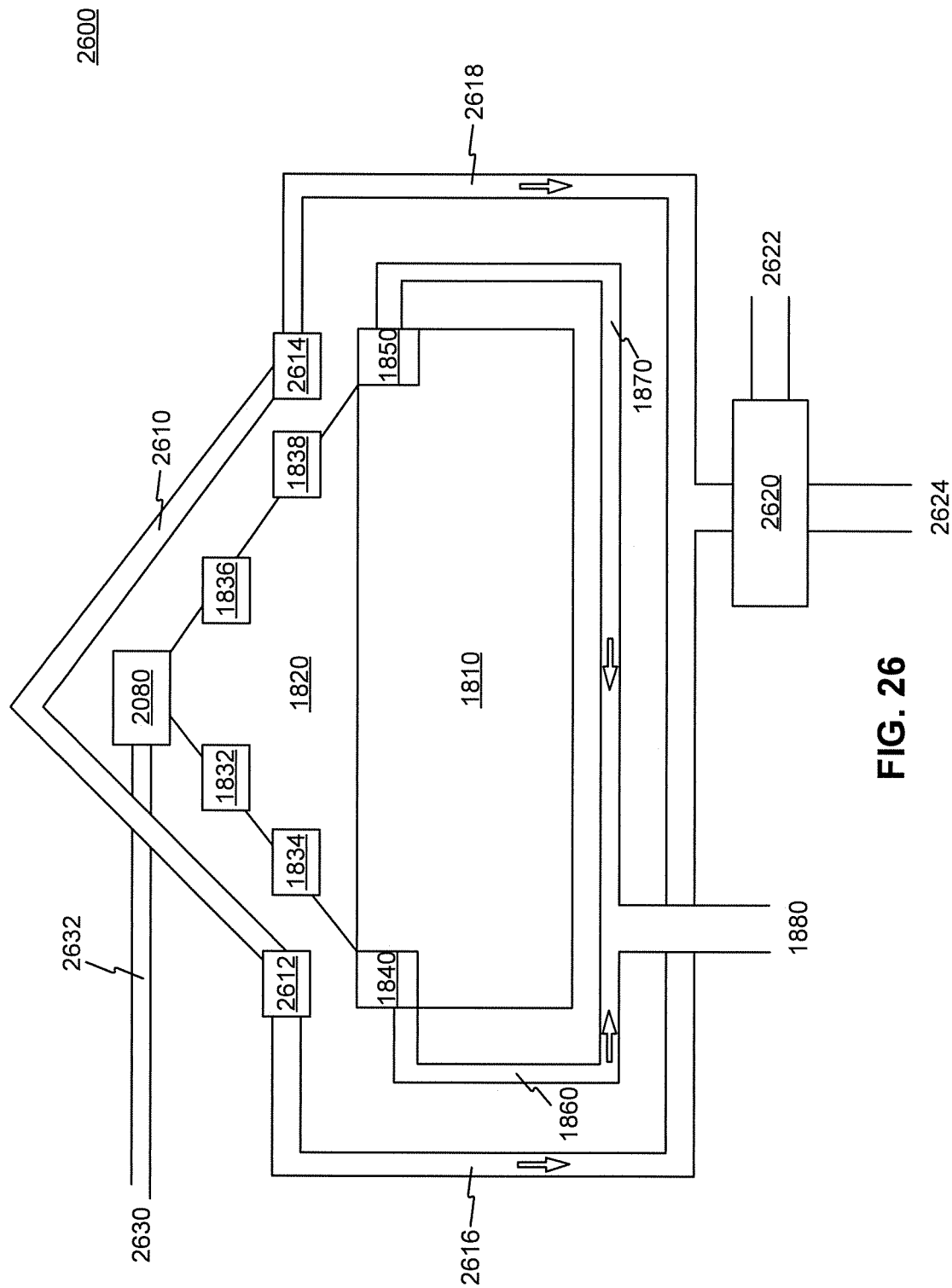
FIG. 26 illustrates an exemplary liquid collecting device, consistent with some embodiments of the present disclosure.

Reference is made to FIG. 26, which illustrates an exemplary liquid collecting device 2600, consistent with some embodiments of the present disclosure. As shown in FIG. 26, in some embodiments, liquid collecting device 2600 have two layers. Operations of some elements, such as base portion 1810, convex portion 1820, container 2080, etc., shown in liquid collecting device 2600 can be the same or similar to the operations of corresponding or similar elements (e.g., elements having the same reference numbers) in liquid collecting device 2000 of FIG. 20, as discussed above.

Compared to liquid collecting device 2000 in FIG. 20, liquid collecting device 2600 further includes a collecting structure 2610 arranged above convex portion 1820 extending axially from base portion 1810. The collecting structure 2610 may be installed and fixed in chamber 110 or chamber 120 and configured to collect at least a portion of the liquid sprayed from heating sprays 142, 144 or cooling sprays 152, 154. The liquid collected by collecting structure 2610 can be used to heat or cool the gas in chamber 110 or chamber 120 during a constant-volume heat-removal process and/or a constant-volume heat-addition process in a Stirling cycle, such as those discussed above in connection with FIG. 2 and FIGS. 3A-3D.

The liquid flows along the surface of collecting structure 2610 will then fall in containers 2612 and 2614. Pipes 2616 and 2618 are respectively coupled to containers 2612 and 2614 and configured to receive the liquid collected by the surface of collecting structure 2610 and discharge the collected liquid to a control valve 2620. Accordingly, the collected liquid, via control valve 2620, can be discharged or directed to an output passage 2622 or an output passage 2624 selectively under the control of control valve 2620.

The gas in chamber 110 or chamber 120 may be configured to flow between spaces beyond and below collecting structure 2610. That is, the gas in the space between collecting structure 2610 and convex portion 1820 can flow to the space beyond collecting structure 2610, and vice versa. The liquid pumped back to container 2080 from an input passage 2630 via a pipe 2632 can be used for heat exchange for the compression or expansion in the cycle. For example, the liquid flown from input passage 2630 are directed to container 2080 via pipe 2632 and then flows along the surface of convex surface 1820. As the gas being expanded or compressed, the temperature of the liquid flowing along the surface of convex surface 1820 falls or rises.

Compared to liquid collecting device 2000 with a single layer, the output power of the heat engine applying liquid collecting device 2600 with two layers can be improved, because there is no limitation on the amount of cool liquid or warm liquid sprayed during the operations. Accordingly, the temperature of the gas can reach a higher maximum value and a lower minimum value.

In addition, a significant portion of the gas having its temperature varied is in the space between collecting structure 2610 and convex portion 1820. Accordingly, the actual operation curve can be closer to the ideal constant temperature (isothermal) curve for both compression or expansion operations, and thus the output power of the heat engine can be improved.

Furthermore, when liquid collecting device 2600 is applied in a heat pump application, all transferred heat is output of the heat pump. For example, as discussed in the embodiments above, for a single-layer liquid collecting device, such as liquid collecting device 2000, under an ideal condition with the heat loss being neglected, 50 kg of liquid at 40 degrees Celsius and 50 kg of liquid at 0 degrees Celsius can be collected in one cycle with 100 kg of liquid at 20 degrees Celsius received. After the heat exchange, the resulted liquid can be liquid at 35 degrees Celsius and 5 degrees Celsius. According to the heat transfer equation, the heat transferred of the heat pump in a single cycle can be calculated as the product of mass, specific heat capacity, and the difference of temperature. In the present case, that would be C·50 kg·5.

On the other hand, for a two-layer liquid collecting device, such as liquid collecting device 2600, the heat moves directly between the liquid at 35 degrees and the liquid at 5 degrees. Therefore, the heat transferred of the heat pump in a single cycle would be C·100 kg·20 (i.e., all heat transferred in the heat exchange process), which is eight times of the heat transferred of the heat pump using a single-layer liquid collecting device.

Figure 27A:
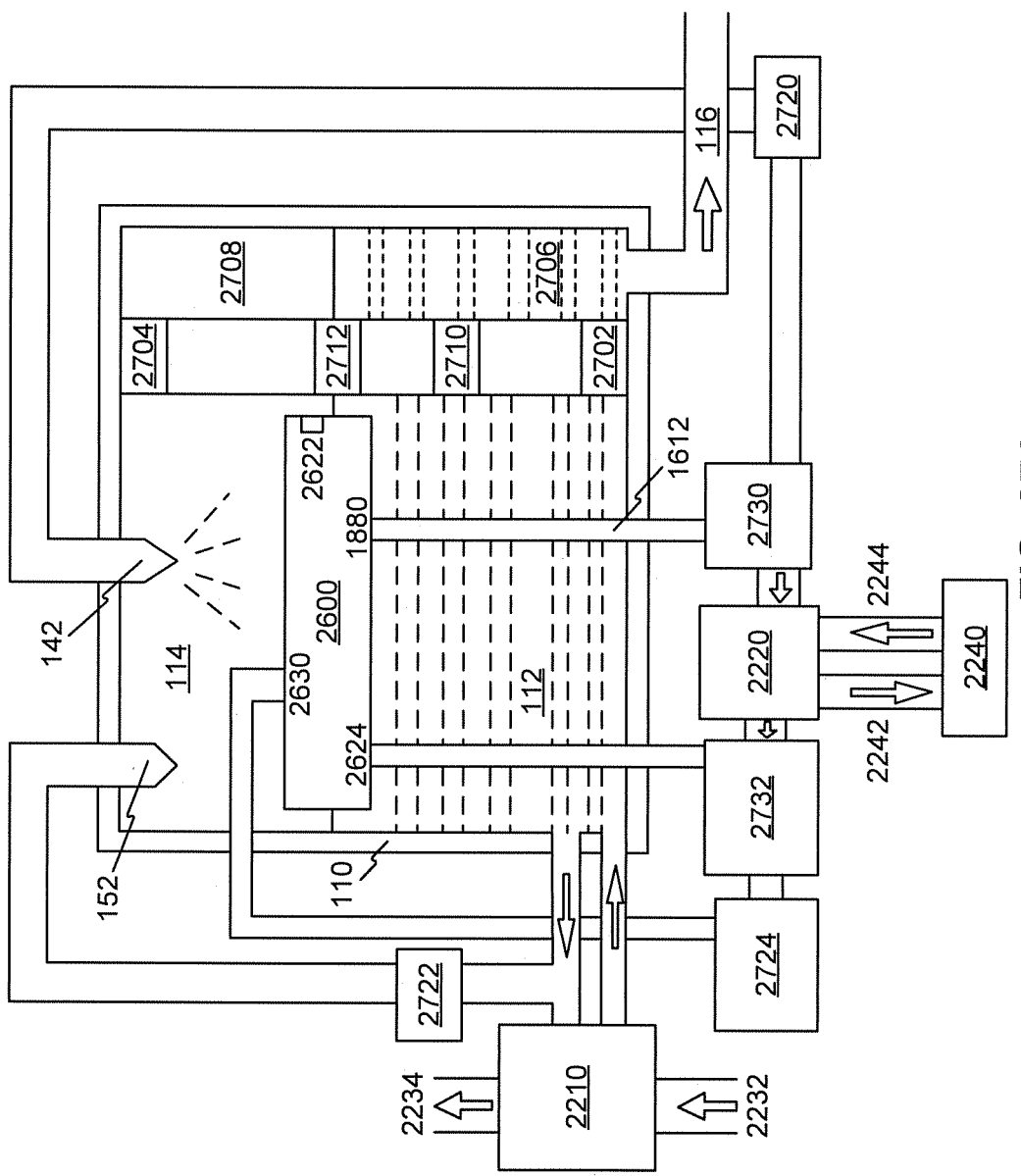
FIG. 27A and FIG. 27B respectively illustrate a portion of exemplary heat pump devices having the liquid collecting device illustrated in FIG. 26, consistent with some embodiments of the present disclosure.

FIG. 27A illustrates a portion of an exemplary heat pump device 2700a having liquid collecting device 2600, consistent with some embodiments of the present disclosure. For ease of understanding, the right-hand side of heat pump device 2700a is omitted herein due to symmetrical arrangement to the left-hand side of heat pump device 2700a illustrated in FIG. 27A. Elements having the same reference numbers in the previous embodiments sharing the same or similar operations as discussed in the embodiments above, and thus detailed operations of these elements are not repeated herein.

As shown in FIG. 27A, chamber 110 is divided into two independent sub-chambers, one of which contains working fluid 2706 and gas in a space 2708 above a portion of working fluid 2706. Control valves 2702, 2704, 2710, and 2712 arranged on the wall separating two sub-chambers are configured to control whether working fluid 2706 and gas is flowable between the two sub-chambers. As shown in FIG. 27A, control valves 2702 and 2710 are arranged below the lowest surface of liquid during the expansion, and control valve 2704 is arranged above the highest surface of liquid during the compression. Liquid tank 2730 is configured to store the liquid outputted from output terminal 1880, and liquid tank 2732 is configured to store the liquid outputted from output passage 2624. Pumps 2720, 2722, and 2724 are respectively configured to pump the liquid back to chamber 110.

During the expansion process acting on the air or gas in space 114, control valves 2702, 2710, 2712 are off and configured to block the flow path. Control valve 2704 is open to provide the flow path between spaces 2708 and 114 for gas. At this time, the air pressure in space 110 is greater than the air pressure in space 120 to push working fluid 2706 via flow passage 116 to chamber 120. As the surface of working fluid 2706 falls accordingly, control valve 2712 is open when the surface of working fluid 2706 is lower than control valve 2712 so that working liquid 112 flows into working fluid 2706 via the flow path. When the surface of working fluid 2706 is lower than control valve 2710, control valve 2710 is open so that working liquid 112 flows into working fluid 2706 via the flow path.

At the same time, pump 2720 is configured to pump the warm liquid stored in liquid tank 2730 to spray the warm liquid through heating spray 142, to heat the gas in space 114. The sprayed liquid, which distributes the heat during the expansion, is collected by liquid collecting device 2600 and flows, via output passage 2624, into liquid tank 2732. Pumps 2722 and 2724 are off during this process.

On the other hand, during the compression process acting on the air or gas in space 114, control valves 2704, 2710, 2712 are off and configured to block the flow path. Control valve 2702 is open to provide the flow path between working liquid 112 and 2706. At this time, working fluid flows, via flow passage 116, into working liquid 112 and 2706 and compress the gas in spaces 114 and 2708.

At the same time, pump 2722 is configured to pump working liquid 112 to spray the liquid through cooling spray 152 to cool the gas in space 114. The sprayed liquid, which absorbs the heat during the compression, is collected by liquid collecting device 2600 and flows, via output passage 2622, back to working liquid 112 directly. Pump 2724 is configured to pump the liquid, with the lowered temperature, stored in liquid tank 2732 back to input passage 2630. After heated in liquid collecting device 2600, the heated liquid flows in to liquid tank 2730 via output terminal 1880. Pump 2720 is off during this process.

As shown in FIG. 27A, working fluid 112 flows through heat exchanger 2210 to absorb heat, and warm liquid stored in liquid tank 2730 flows, through heat exchanger 2220 and into liquid tank 2732, to distribute heat in order to reduce its temperature. It would be appreciated that the heat transfer performed by heat exchangers 2210, 2220 is independent from the expansion and compression process, and can be performed anytime during the complete cycle.

Figure 27B:
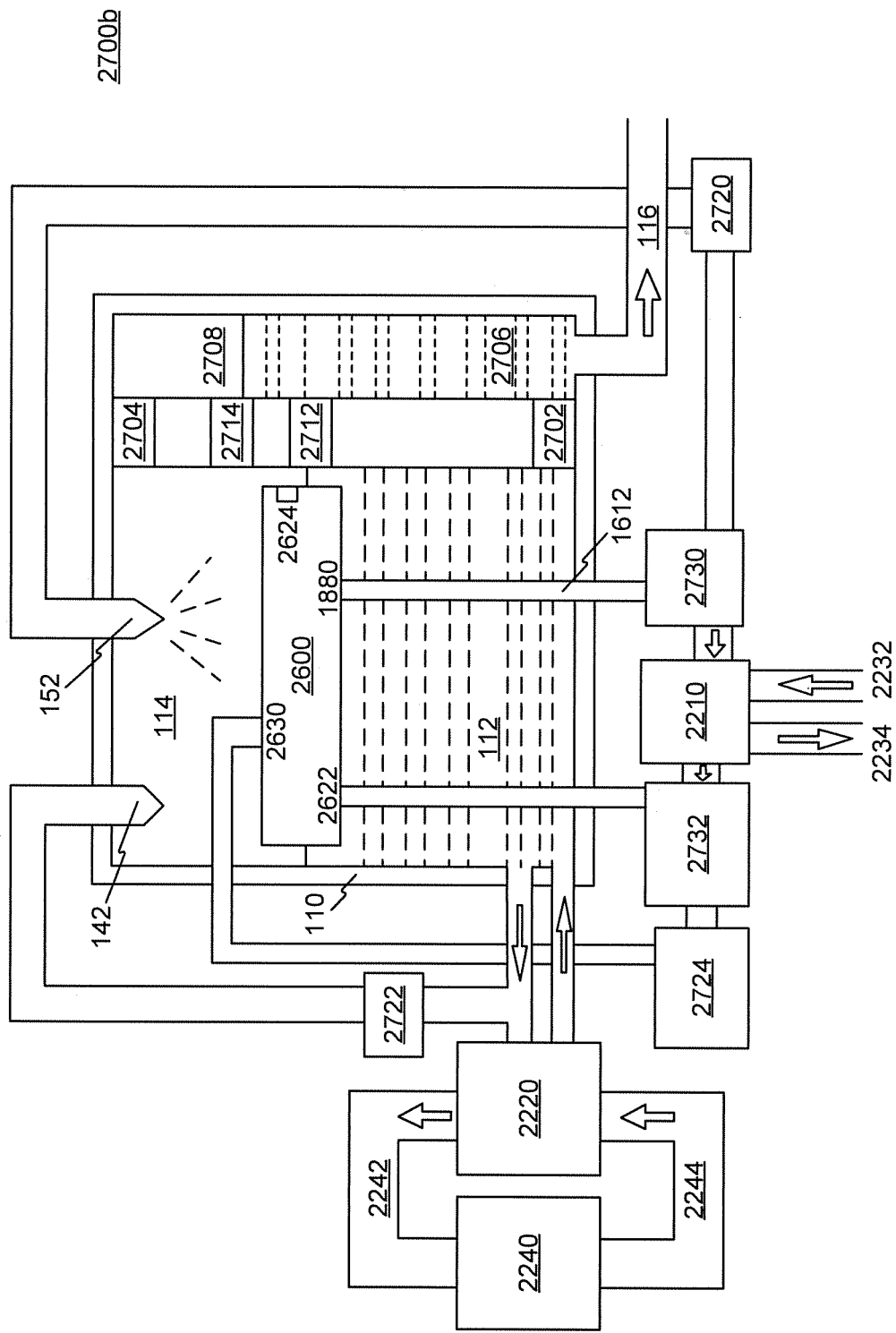

FIG. 27B illustrates a portion of another exemplary heat pump device 2700b having liquid collecting device 2600, consistent with some embodiments of the present disclosure. For ease of understanding, the right-hand side of heat pump device 2700b is omitted herein due to symmetrical arrangement to the left-hand side of heat pump device 2700b illustrated in FIG. 27A. Compared to heat pump device 2700a illustrated in FIG. 27A, in heat pump device 2700b, working fluid 112 is used as the warm liquid, while in heat pump device 2700a, working fluid 112 is used as the cool liquid.

As shown in FIG. 27B, control valves 2702 is arranged below the lowest surface of liquid during the expansion, and control valves 2704 and 2714 are arranged above the highest surface of liquid during the compression. Liquid tank 2730 is configured to store the cool liquid outputted from output terminal 1880, and liquid tank 2732 is configured to store the liquid outputted from output passage 2622. Pumps 2720, 2722, and 2724 are respectively configured to pump the liquid back to chamber 110.

During the expansion process acting on the air or gas in space 114, control valves 2704, 2712, 2714 are off and configured to block the flow path. Control valve 2702 is open to provide the flow path between working liquid 112 and 2706. At this time, working fluid 112 flows, via the flow path provided by control valve 2702 into working liquid 2706, and then flows, via flow passage 116, to chamber 120. At the same time, pump 2722 is configured to pump working liquid 112 to spray the liquid through heating spray 142 to heat the gas in space 114. The sprayed liquid, which distributes the heat during the expansion, is collected by liquid collecting device 2600 and flows, via output passage 2624, back to working liquid 112 directly. Pump 2724 is configured to pump the liquid, with the increased temperature, stored in liquid tank 2732 back to input passage 2630. After cooled in liquid collecting device 2600, the cooled liquid flows in to liquid tank 2730 via output terminal 1880. Pump 2720 is off during this process.

On the other hand, during the compression process acting on the air or gas in space 114, control valve 2702 is off and configured to block the flow path. Control valves 2710, 2712, 2714 are open to provide the flow path between spaces 2708 and 114 for gas. At this time, the air pressure in space 110 is lower than the air pressure in space 120 to push the working fluid from chamber 120, via flow passage 116, to chamber 110. When the surface of working fluid 2706 is higher than control valve 2712, working fluid 2706 flows into working fluid 112 via the flow path provided by control valve 2712. When the surface of working fluid 112 reaches the height of control valve 2712, control valve 2712 is turned off. Similarly, when the surface of working fluid 2706 is higher than control valve 2714, working liquid 2706 flows into working fluid 112 via the flow path provided by control valve 2714. When the surface of working fluid 112 reaches the height of control valve 2714, control valve 2714 is turned off.

At the same time, pump 2720 is configured to pump the cool liquid stored in liquid tank 2730 to spray the cool liquid through cooling spray 152, to cool the gas in space 114. The sprayed liquid, which absorbs the heat during the compression, is collected by liquid collecting device 2600 and flows, via output passage 2622, into liquid tank 2732. Pumps 2722 and 2724 are off during this process.

In the embodiments of FIG. 27B, working fluid 112 flows through heat exchanger 2220 to distribute heat, and cool liquid stored in liquid tank 2730 flows, through heat exchanger 2210 and into liquid tank 2732, to absorb heat in order to increase its temperature. Similar to the embodiments of FIG. 27A, it would be appreciated that the heat transfer performed by heat exchangers 2210, 2220 is independent from the expansion and compression process, and can be performed anytime during the complete cycle.

Figure 28A:
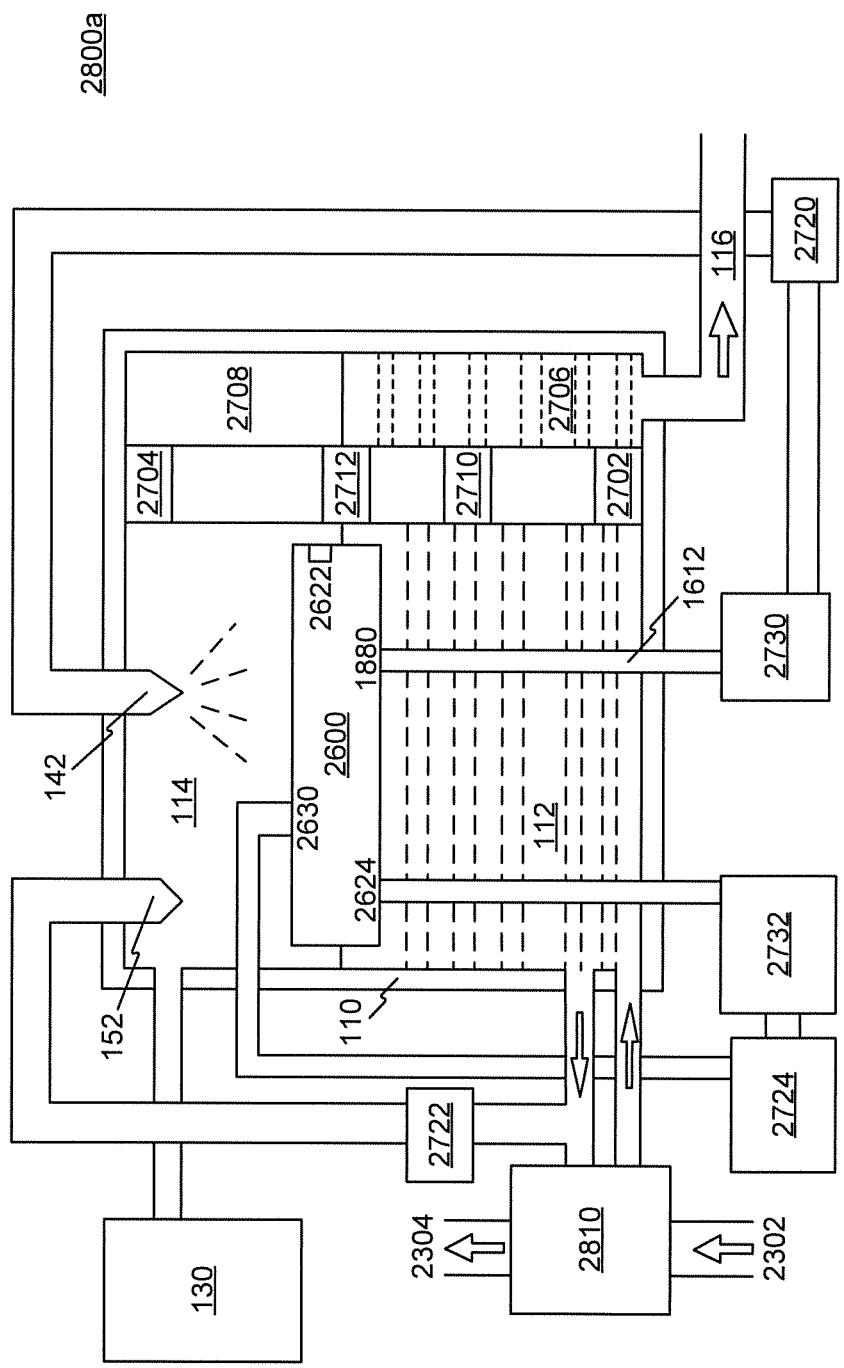
FIG. 28A and FIG. 28B respectively illustrate a portion of exemplary heat engine devices having the liquid collecting device illustrated in FIG. 26, consistent with some embodiments of the present disclosure.
Figure 28B:
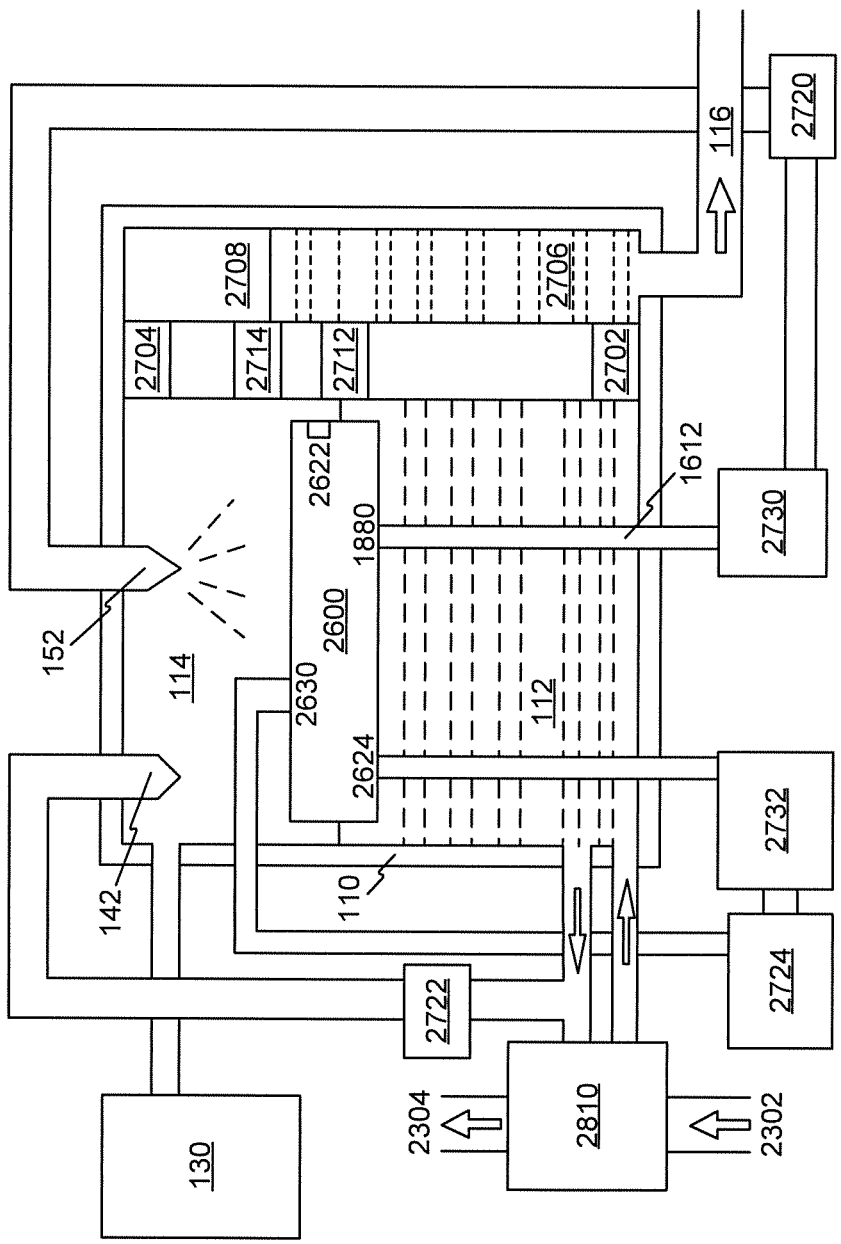

FIG. 28A and FIG. 28B respectively illustrate a portion of exemplary heat engine devices 2800a and 2800b having liquid collecting device 2600, consistent with some embodiments of the present disclosure. Heat engine devices 2800a and 2800b share the similar configurations and operations of heat pump devices 2700a and 2700b respectively. In FIG. 28A, heat engine device 2800a includes a heat exchanger 2810 configured to absorb the heat from input passage 2302. Accordingly, heat engine device 2800a is able to convert the heat energy into power outputted by power-extraction unit 130. Similarly, in FIG. 28B, heat exchanger 2810 is also configured to absorb the heat from input passage 2302. Accordingly, heat engine device 2800b is able to convert the heat energy into power outputted by power-extraction unit 130.

In the foregoing specification, embodiments have been described with reference to numerous specific details that can vary from implementation to implementation. Certain adaptations and modifications of the described embodiments can be made. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the drawings and specification, there have been disclosed exemplary embodiments. It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A heat pump comprising:
a first chamber containing a working fluid and a first space within the first chamber, the first space being above at least a portion of the working fluid that is within the first chamber;
a second chamber fluidly coupled with the first chamber, the working fluid flowable between the first chamber and the second chamber via at least one flow passage between the first chamber and the second chamber, the second chamber containing a second space within the second chamber, the second space being above at least a portion of the working fluid that is within the second chamber;
at least one first spray device coupled with the first chamber, the at least one first spray device being configured to heat or cool the first space in the first chamber by spaying at least one of liquid or gas into the first chamber; and
a first liquid collecting device coupled to the at least one first spray device and arranged to float near a surface of the working fluid within the first chamber;
at least one second spray device coupled with the second chamber, the at least one second spray device being configured to heat or cool the second space in the second chamber by spaying at least one of liquid or gas into the second chamber;
a second liquid collecting device coupled to the at least one second spray device and arranged to float near a surface of the working fluid within the second chamber; and
a control valve coupled with the first liquid collecting device, wherein the first liquid collecting device is coupled to the at least one first spray device via the control valve;
wherein at least one of the heating and cooling of the first space causes at least one of a compression or expansion of the second space.

2. The heat pump of claim 1, wherein the at least one first spray device comprises:
a first heating spray configured to heat the first space in the first chamber, wherein the first heating spray sprays a liquid having a temperature higher than a current temperature of the first space; and
a first cooling spray configured to cool the first space in the first chamber, wherein the first cooling spray sprays a liquid having a temperature lower than the current temperature of the first space;
wherein the first liquid collecting device is configured to collect at least a portion of the liquid sprayed by the first heating spray or by the first cooling spray.

3. The heat pump of claim 2, further comprising:
a first liquid tank coupled with the control valve; and
a second liquid tank coupled with the control valve;
wherein the control valve is configured to control liquid collected by the first liquid collecting device to flow into the first liquid tank or the second liquid tank, and the temperature of the liquid in the first liquid tank is lower than the temperature of the liquid in the second liquid tank.

4. The heat pump of claim 3, wherein the first heating spray is configured to spray the liquid in the second liquid tank to the first chamber.

5. The heat pump of claim 3, wherein the first cooling spray is configured to spray the liquid in the first liquid tank to the first chamber.

6. The heat pump of claim 1, wherein the first liquid collecting device comprises:
a base portion configured to float near the surface of the working fluid within the first chamber;
at least one convex surface over the base portion; and
at least one pipe arranged near a bottom portion of the at least one convex surface to accept the liquid collected by the at least one convex surface.

7. The heat pump of claim 6, wherein the first liquid collecting device further comprises:
at least one flow-directing structure located on the at least one convex surface and configured to direct the flow of the liquid flowing through the at least one convex surface.

8. The heat pump of claim 6, wherein the first liquid collecting device further comprises:
a first container arranged above the at least one convex surface;
a second container coupled to the at least one pipe and configured to store the liquid flowing through the at least one pipe; and
a pump coupled between the first container and the second container and configured to pump the liquid in the second container to the first container.

9. The heat pump of claim 8, wherein the first liquid collecting device further comprises:
a control valve coupled to the second container and configured to discharge the liquid in the second container to a first liquid tank or a second liquid tank.

10. The heat pump of claim 6, wherein the first liquid collecting device further comprises:
a first container arranged above the at least one convex surface;
and the heat pump further comprises:
a second container coupled to the at least one pipe and configured to collect the liquid flowing through the at least one pipe; and
a pump coupled between the first container and the second container and configured to pump the liquid in the second container to the first container.

11. The heat pump of claim 10, wherein the heat pump further comprises:
a control valve coupled to the second container and configured to discharge the liquid in the second container to a first liquid tank or a second liquid tank.

12. An energy generation system comprising:
one or more devices to generate power, comprising:
   a first chamber containing a working fluid and a first space within the first chamber, the first space being above at least a portion of the working fluid that is within the first chamber;
   a second chamber fluidly coupled with the first chamber, the working fluid flowable between the first chamber and the second chamber via at least one flow passage between the first and second chambers, the second chamber containing a second space within the second chamber, the second space being above at least a portion of the working fluid that is within the second chamber;
   at least one first spray device coupled with the first chamber, the at least one first spray device being configured to heat or cool the first space in the first chamber by spaying at least one of liquid or gas into the first chamber;
   a first liquid collecting device coupled to the at least one first spray device and arranged to float near a surface of the working fluid within the first chamber;
   a control valve coupled with the first liquid collecting device, wherein the first liquid collecting device is coupled to the at least one first spray device via the control valve;
   at least one second spray device coupled with the second chamber, the at least one second spray device being configured to heat or cool the second space in the second chamber by spaying at least one of liquid or gas into the second chamber;
   a second liquid collecting device coupled to the at least one second spray device and arranged to float near a surface of the working fluid within the second chamber; and
   a power-extraction unit coupled with the second chamber;
   wherein at least one of the heating and cooling of the first space causes at least one of a compression or expansion of the second space, and the at least one of a compression or expansion of the second space drives the power-extraction unit.

13. The energy generation system of claim 12, wherein the at least one first spray device comprises a first heating spray configured to heat the first space, and a first cooling spray configured to cool the first space, and the energy generation system further comprises:
   an input passage connecting to the first heating spray of the one or more devices and configured to provide the working fluid having a temperature higher than a current temperature of the first space; and
   an output passage connecting to the first liquid collecting device and the second liquid collecting device of the one or more devices and configured to output the working fluid having a temperature lower than the current temperature of the first space.

14. The energy generation system of claim 13, wherein any one of the one or more devices comprises:
   a first liquid tank coupled with the control valve; and
   a second liquid tank coupled with the control valve, wherein the temperature of the liquid in the first liquid tank is lower than the temperature of the liquid in the second liquid tank;
   wherein the first liquid collecting device is configured to collect at least a portion of the liquid sprayed by the first heating spray or by the first cooling spray, and the control valve is configured to control the liquid collected by the first liquid collecting device to flow into the first liquid tank or the second liquid tank.

15. The energy generation system of claim 14, wherein the first heating spray is configured to spray the liquid in the second liquid tank to the first chamber, and the first cooling spray is configured to spray the liquid in the first liquid tank to the first chamber.

16. The energy generation system of claim 14, wherein any one of the one or more devices comprises:
   a second control valve coupled with the first liquid tank and the output passage, and configured to control a passage for discharging the working fluid from the first liquid tank to the output passage.

17. The energy generation system of claim 12, further comprising a generator that generates electricity driven by gas or by the working fluid outputted from the power-extraction unit, in response to variations in a temperature of the first space and of the second space of the one or more devices.

18. A heat exchanging system, comprising:
at least one heat pump, comprising:
   a first chamber containing a working fluid and a first space within the first chamber, the first space being above at least a portion of the working fluid that is within the first chamber;
   a second chamber fluidly coupled with the first chamber, the working fluid flowable between the first chamber and the second chamber via at least one flow passage between the first and second chambers, the second chamber containing a second space within the second chamber, the second space being above at least a portion of the working fluid that is within the second chamber;
   at least one first spray device coupled with the first chamber, the at least one first spray device being configured to heat or cool the first space in the first chamber by spaying at least one of liquid or gas into the first chamber;
   a first liquid collecting device coupled to the at least one first spray device and arranged to float near a surface of the working fluid within the first chamber;
   at least one second spray device coupled with the second chamber, the at least one second spray device being configured to heat or cool the second space in the second chamber by spaying at least one of liquid or gas into the second chamber; and
   a second liquid collecting device coupled to the at least one second spray device and arranged to float near a surface of the working fluid within the second chamber;
an input passage connecting to the at least one first spray device and the at least one second spray device and configured to provide the working fluid having a first temperature;
a first output passage connecting to the first and the second liquid collecting devices of the at least one heat pump and configured to output the working fluid having a temperature higher than the first temperature; and
a second output passage connecting to the first and the second liquid collecting devices of the at least one heat pump and configured to output the working fluid having a temperature lower than the first temperature.

19. The heat exchanging system of claim 18, further comprising:
   a first heat exchanger coupled with the heat pump and with a cooling tower, and configured to transfer heat between the working fluid flowing from the first output passage and a liquid flowing from the cooling tower.

20. The heat exchanging system of claim 18, further comprising:
a second heat exchanger coupled with the heat pump and with a gas pipe, and configured to transfer heat between air flowing through the gas pipe and the working fluid flowing from the second output passage.

* * * * *

UNITED STATES PATENT AND TRADEMARK OFFICE
CERTIFICATE OF CORRECTION

PATENT NO. : 11,199,114 B2
APPLICATION NO. : 16/737629
DATED : December 14, 2021
INVENTOR(S) : Chih Hung Wang Page 1 of 1

It is certified that error appears in the above-identified patent and that said Letters Patent is hereby corrected as shown below:

In the Claims

In Claim 1, Column 27, Line 41, "spaying" should read --spraying--.

In Claim 1, Column 27, Line 49, "spaying" should read --spraying--.

In Claim 12, Column 29, Line 18, "spaying" should read --spraying--.

In Claim 12, Column 29, Line 30, "spaying" should read --spraying--.

In Claim 18, Column 30, Line 38, "spaying" should read --spraying--.

In Claim 18, Column 30, Line 46, "spaying" should read --spraying--.

Signed and Sealed this
Eighth Day of February, 2022

Drew Hirshfeld
*Performing the Functions and Duties of the
Under Secretary of Commerce for Intellectual Property and
Director of the United States Patent and Trademark Office*